United States Patent
Luo

(10) Patent No.: US 12,393,450 B2
(45) Date of Patent: Aug. 19, 2025

(54) PROCESSING APPARATUS AND SYSTEM FOR EXECUTING DATA PROCESSING ON A PLURALITY OF PIECES OF CHANNEL INFORMATION

(71) Applicant: Beijing ESWIN Computing Technology Co., Ltd., Beijing (CN)

(72) Inventor: Shilin Luo, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 483 days.

(21) Appl. No.: 18/089,146

(22) Filed: Dec. 27, 2022

(65) Prior Publication Data

US 2023/0267000 A1 Aug. 24, 2023

(30) Foreign Application Priority Data

Feb. 23, 2022 (CN) .......................... 202210168418.8

(51) Int. Cl.
*G06F 9/48* (2006.01)
*G06F 9/30* (2018.01)

(52) U.S. Cl.
CPC .......... *G06F 9/4881* (2013.01); *G06F 9/3016* (2013.01)

(58) Field of Classification Search
CPC .............................. G06F 9/4881; G06F 9/3016
See application file for complete search history.

(56) References Cited

U.S. PATENT DOCUMENTS

| 5,754,436 A | 5/1998 | Walsh et al. |
| 9,684,615 B1 | 6/2017 | Nguyen et al. |
| 10,637,142 B1 | 4/2020 | Tran et al. |

(Continued)

FOREIGN PATENT DOCUMENTS

| CN | 102567256 A | 7/2012 |
| CN | 104461970 A | 3/2015 |

(Continued)

OTHER PUBLICATIONS

Office Action for U.S. Appl. No. 18/089,096 dated Aug. 27, 2024, 35 pages.

(Continued)

*Primary Examiner* — Wissam Rashid
(74) *Attorney, Agent, or Firm* — CARTER, DELUCA & FARRELL LLP

(57) ABSTRACT

A processing apparatus and a system for executing data processing on a plurality of pieces of channel information are disclosed. The processing apparatus includes: a channel information acquiring circuit, configured to acquire target channel information among the plurality of pieces of channel information; a storing circuit, including a plurality of storage regions corresponding to the plurality of pieces of channel information; a reading circuit, configured to sequentially pre-store the data information from the plurality of storage regions of the storing circuit to the pre-storing circuit; and a pre-storing circuit, configured to pre-store the data information from the plurality of storage regions of the storing circuit to wait for use in the data processing, and output pre-stored target data information corresponding to the target channel information, according to the acquired target channel information, for use in the data processing.

16 Claims, 17 Drawing Sheets

(56) References Cited

U.S. PATENT DOCUMENTS

| | | |
|---|---|---|
| 11,409,685 B1 | 8/2022 | Kaplan et al. |
| 11,500,802 B1 | 11/2022 | Xu et al. |
| 11,669,473 B2 | 6/2023 | Vishnu et al. |
| 11,714,765 B2 | 8/2023 | Underwood et al. |
| 11,847,507 B1 | 12/2023 | Borkovic |
| 11,868,872 B1 | 1/2024 | Minkin et al. |
| 2002/0018598 A1 | 2/2002 | Maeda et al. |
| 2004/0093438 A1 | 5/2004 | Odom |
| 2006/0218313 A1 | 9/2006 | Haneda et al. |
| 2008/0126600 A1 | 5/2008 | Mitchell et al. |
| 2009/0287857 A1 | 11/2009 | Vu |
| 2011/0013696 A1 | 1/2011 | Hiramatsu et al. |
| 2014/0040512 A1 | 2/2014 | Fernald |
| 2014/0112645 A1 | 4/2014 | Otani |
| 2014/0259149 A1 | 9/2014 | Circello et al. |
| 2017/0004101 A1 | 1/2017 | Shao |
| 2018/0025038 A1 | 1/2018 | Semlani et al. |
| 2018/0204111 A1 | 7/2018 | Zadeh et al. |
| 2019/0313251 A1 | 10/2019 | Michiels |
| 2019/0347542 A1 | 11/2019 | Chen et al. |
| 2020/0104167 A1 | 4/2020 | Chen et al. |
| 2020/0184278 A1 | 6/2020 | Zadeh et al. |
| 2020/0364088 A1 | 11/2020 | Ashwathnarayan et al. |
| 2021/0357742 A1 | 11/2021 | Restuccia et al. |
| 2022/0083486 A1 | 3/2022 | George et al. |
| 2022/0121884 A1 | 4/2022 | Zadeh et al. |
| 2022/0318015 A1* | 10/2022 | Alsop .................. G06F 9/3836 |

FOREIGN PATENT DOCUMENTS

| | | |
|---|---|---|
| CN | 111047036 A | 4/2020 |
| CN | 112445431 A | 3/2021 |
| CN | 112765059 A | 5/2021 |

OTHER PUBLICATIONS

Office Action for U.S. Appl. No. 18/089,776 dated May 17, 2024, 27 pages.
Office Action for U.S. Appl. No. 18/089,748 dated Jun. 6, 2024, 24 pages.
Office Action for U.S. Appl. No. 18/087,991 dated Jun. 21, 2024, 14 pages.
Wang Hongli, "Design and Implementation of Convolutional Neural Network Hardware Accelerator", China Excellent Master Dissertation Full Text Database Information Science and Technology Series, May 2020, Xiangtan University (69 pages).
Chinese Office Action for application No. 202210167581.2 dated Apr. 3, 2025, with English Translation, 51 pages.

* cited by examiner

| Instruction Fetching | Decoding | Data Fetching | Executing | Writing Back | | | | |
|---|---|---|---|---|---|---|---|---|
| | Instruction Fetching | Decoding | Data Fetching | Executing | Writing Back | | | |
| | | Instruction Fetching | Decoding | Data Fetching | Executing | Writing Back | | |
| | | | Instruction Fetching | Decoding | Data Fetching | Executing | Writing Back | |
| | | | | Instruction Fetching | Decoding | Data Fetching | Executing | Writing Back |

FIG. 1

PROCESSING APPARATUS AND SYSTEM FOR EXECUTING DATA PROCESSING ON A PLURALITY OF PIECES OF CHANNEL INFORMATION

CROSS REFERENCE

The application claims priority to Chinese patent application No. 202210168418.8, filed on Feb. 23, 2022, the entire disclosure of which is incorporated herein by reference as part of the present application.

TECHNICAL FIELD

Embodiments of the present disclosure relate to a processing apparatus, a method and a computer system for executing data processing on a plurality of pieces of channel information.

BACKGROUND

In a computer system, data exchange between an I/O device and a memory, and between a memory and a memory is usually required. The Direct Memory Access (DMA) technology is a high-speed data transmission mode, which allows direct data transmission between an external device and a memory, and between a memory and a memory. The DMA process is mainly implemented by hardware, and in this case, data exchange between an external device and a memory is not controlled by a Central Processing Unit (CPU), but is directly completed with a system bus controlled by a DMA hardware controller.

SUMMARY

According to a first aspect of the present disclosure, a processing apparatus for executing data processing on a plurality of pieces of channel information is proposed, including a channel information acquiring circuit, a storing circuit, a reading circuit, and a pre-storing circuit; the channel information acquiring circuit is configured to acquire target channel information among the plurality of pieces of channel information; the storing circuit includes a plurality of storage regions corresponding to the plurality of pieces of channel information, and each of the plurality of storage regions is configured to store data information for any one piece of channel information among the plurality of pieces of channel information; the reading circuit is configured to sequentially pre-store the data information from the plurality of storage regions of the storing circuit to the pre-storing circuit; and the pre-storing circuit is configured to pre-store the data information from the plurality of storage regions of the storing circuit to wait for use in the data processing, and output pre-stored target data information corresponding to the target channel information, according to the acquired target channel information, for use in the data processing.

According to a second aspect of the present disclosure, a computer system is proposed, including the processing apparatus according to the first aspect and a neural-network processor; the neural-network processor is electrically coupled to the processing apparatus, and the neural-network processor includes at least one processing unit array and a plurality of global buffer clusters; and the data information indicates address information of target data, the address information is obtained based on a mapping relationship between the target data and at least one processing unit in the processing unit array, and each of the global buffer clusters is configured to receive the moved data information or the moved target data indicated by the data information on one piece of channel information among the plurality of pieces of channel information.

According to a third aspect of the present disclosure, a scheduling method for executing data processing on a plurality of pieces of channel information is proposed, including: pre-storing data information for any one piece of channel information among the plurality of pieces of channel information from a plurality of storage regions corresponding to the plurality of piece of channel information, to wait for use in the data processing; acquiring target channel information among the plurality of pieces of channel information; and outputting the target data information pre-stored corresponding to the target channel information, according to the target channel information acquired, to wait for use in the data processing.

BRIEF DESCRIPTION OF THE DRAWINGS

In order to more clearly illustrate the technical solutions of the embodiments of the present disclosure, the drawings that need to be used in description of the embodiments will be briefly described in the following. Apparently, the drawings in the following description are only some embodiments of the present disclosure. For those skilled in the art, other drawings can also be obtained based on these drawings without any inventive work. The following drawings are not deliberately scaled and drawn according to the actual size, and the emphasis is on illustrating the subject matter of the present disclosure.

FIG. 1 illustrates an example of a pipeline processing instruction;

DETAILED DESCRIPTION

Figure 2:
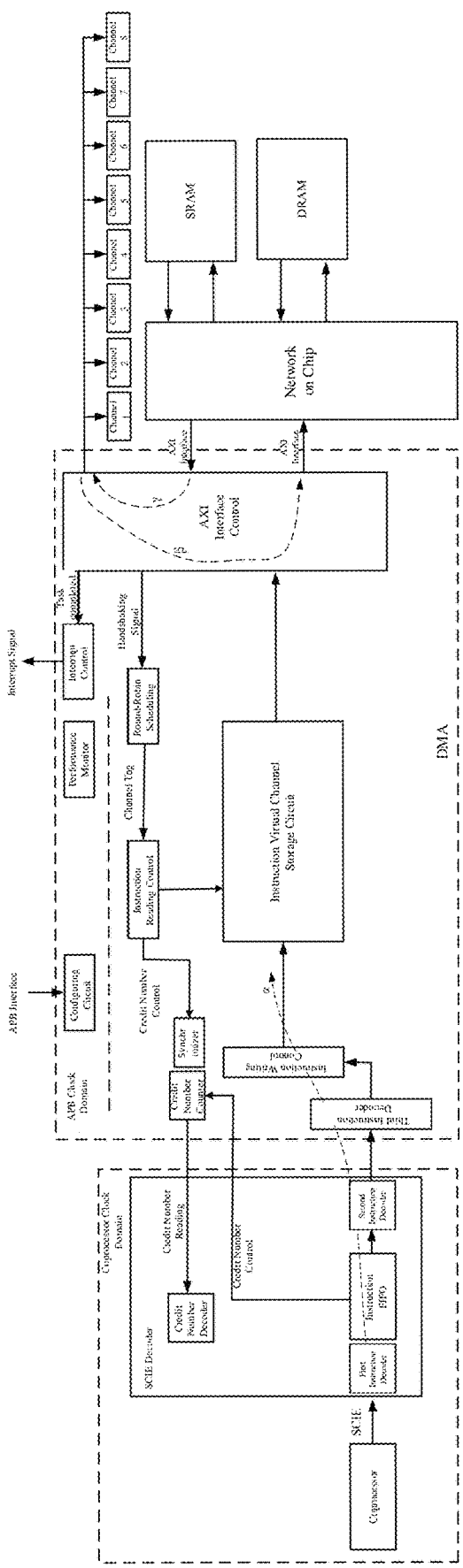
FIG. 2 illustrates an exemplary architecture of a coprocessor-based DMA (Direct Memory Access) used in a row stationary NPU (Neural-Network Processing Unit)

The technical solutions in the embodiments of the present disclosure will be described in a clearly and fully understandable way in conjunction with the drawings. Apparently, the described embodiments are only a part but not all of the embodiments of the present disclosure. Based on the embodiments of the present disclosure, those ordinarily skilled in the art can acquire other embodiment(s), without any inventive work, which should be within the scope of the present disclosure.

As illustrated in the present disclosure and claims, unless the context clearly indicates an exception, the words such as "a", "an" and/or "the" are not specific to singular, or may also include plural. In general, the terms "include" and "comprise" only suggest that steps and elements that are clearly identified are included, these steps and elements do not constitute an exclusive list, and the method or the device may also comprise other steps or elements.

Although the present disclosure makes various references to certain modules in the system according to the embodiments of the present disclosure, any number of different modules may be used and run on a user terminal and/or a server. The modules are merely illustrative, and different aspects of the system and the method may use different modules.

The flow chart is used in the present disclosure to illustrate the operations executed by the system according to the embodiments of the present disclosure. It should be understood that, preceding or following operations are not necessarily executed precisely in order. Instead, the respective steps may be processed in a reverse order or at a same time as needed. Meanwhile, other operations may also be added to these processes, or a certain step or several steps may be removed from these processes.

A pipeline technology refers to that a repeated procedure is decomposed into several sub-procedures, each sub-procedure is implemented by a special functional component, a plurality of processing procedures are staggered in time, and each sub-procedure may run in parallel with other sub-procedures through respective functional segments sequentially.

FIG. 1 illustrates an example of a pipeline processing instruction. As illustrated in FIG. 1, when a computer executes one instruction, five steps are needed: instruction fetching, decoding, data fetching, executing, and writing back, which takes five CPU cycles to complete. In the pipeline technology, the respective steps of the respective instructions may be overlapped for execution, instead of executing a next instruction only after one instruction is completed. That is, while decoding after fetching a first instruction, fetching a second instruction; when fetching data for the first instruction, decoding the second instruction, and fetching a third instruction, . . . , and so on. After the pipeline technology is used, although execution of each instruction still needs to go through the above-described five steps and the same number of CPU cycles, and execution of each instruction is still completed in one instruction cycle, yet the number of instructions completed within unit time increases with an instruction segment viewed comprehensively, that is, instruction per clock (IPC) of the CPU is improved and instruction processing efficiency is improved.

For example, in a Neural-network Processing Unit (NPU, or a neural-network Processor) system of a complex row stationary data flow, a Direct Memory Access (DMA) needs to perform data moving according to a mapping relationship of data. Some algorithms are used to cut the data of an input feature map or a filter, a coprocessor outputs an instruction to the DMA, and the DMA decodes the instruction output by the coprocessor and moves the data of the NPU according to a decoding result.

FIG. 2 illustrates an exemplary architecture of a coprocessor-based DMA used in a row stationary NPU. For example, the Chinese patent application with Application No. 202111659158.6 entitled "DATA MOVING METHOD, DIRECT MEMORY ACCESS APPARATUS AND COMPUTER SYSTEM" may be referred to for the relevant description of the DMA, which will be further described as follows.

As illustrated in FIG. 2, the SCIE decoder is located in a coprocessor clock domain, and the coprocessor outputs instructions through an SCIE bus interface. It should be understood that the instructions output by the coprocessor may be R-type instructions in an RISC-V instruction set. The domain of the R-type instruction is 32 bits, including 7-bit opcode, 5-bit rd, 3-bit func3, 5-bit rs1, 5-bit rs2, and 7-bit func7; and opcode indicates an operation code, rd indicates a number of a destination register, func3 is an expandable operation code/function code, rs1 indicates a number of a first source register, rs2 indicates a number of a second source register, and func7 is an expandable operation code/function code.

The func3 in the R-type instruction is used to indicate different functions of the R-type instruction, and these functions include address, logic, operation, etc., and func3 of the R-type instruction that indicates address is a fixed value [000]. An instruction whose function indicated by func3 is address may be a data moving instruction. Some bits (e.g., three bits) in func7 of the R-type instruction may be used to encode the type of the data moving instruction. In an example, three bits in func7 of the R-type instruction may be used to encode five types of the data moving instruction below:

①: Request for uncompressed data of the input feature map;
②: Request for uncompressed data of the filter;
③: Request for compressed data of the filter;
④: Reading a credit number (significand) of requests for the data of the input feature map;
⑤: Reading a credit number of requests for the data of the filter.

Exemplarily, codes for the above-described five types of the data moving instructions are as follows:

| Types of the data moving instruction | ① | ② | ③ | ④ | ⑤ |
|---|---|---|---|---|---|
| Codes | 100 | 110 | 111 | 010 | 011 |

The 5-bit rs1, rs2 and rd in the data moving instruction respectively indicate addresses of the first source register, the second source register, and the destination register. In the present disclosure, at least one of the first source register, the second source register, and the destination register may use at least some bits to encode information associated with DMA data moving according to the mapping relationship of the input feature map or the filter. A first source register with a length of 32 bits may be used to encode address information of data to be moved during data moving, and the address information of the data to be moved may include base address information and offset address information. At least some bits of the second source register may be used to encode Identification Information (ID) of the DMA executing the data moving instruction. In the NPU system of the row stationary data flow, a plurality of DMAs may be used to execute tasks of data moving, for example, a first task of data moving may be executed by a first DMA, a second task of data moving may be executed by a second DMA, and so on. At least some bits of the second source register may be used to encode channel information in the DMA executing the data moving instruction. Eyeriss V2 is a neural-network processor of the row stationary data flow; Eyeriss V2 includes a plurality of Global Buffer (GLB) clusters; and each GLB cluster is configured to store data or instructions that the DMA moves by executing the data moving instructions. When the DMA executes data moving instructions, the data or the instructions moved may be stored in different GLB clusters, and data channels corresponding thereto in the DMA may also be different. For example, the data or the instructions moved may be stored in 8 different GLB clusters, and the DMA may include 8 data channels corresponding to the 8 GLB clusters. The data channel here may be a channel of the DMA as described above in the present disclosure. At least some bits of the destination register may be used to encode the credit number of requests for data of the input feature map or the credit number of requests for data of the filter. The credit number of requests for data may be the number of requests for data. For example, if the credit number is 5, it indicates that there are 5 requests for data.

Exemplarily, the instruction output by the coprocessor may be a first type instruction; the first type instruction is an R-type instruction (indicated by opcode being a fixed value [0110011]), and is a data moving instruction (indicated by func3 being a fixed value [000]); and the type of the data moving instruction corresponding to the instruction is ① (indicated by a code of func7 according to the present disclosure). At least some bits in the first source register of the instruction indicate offset address information of the data to be moved, and at least some bits in the second source register of the instruction indicate length information of the data to be moved. The first type instruction may further include at least one of the codes of the identification information of the DMA and the code of the channel information in the DMA as described above in the present disclosure, and at least some bits in the second source register of the first type instruction may indicate the identification information of the DMA and/or the channel information in the DMA.

Exemplarily, the instruction output by the coprocessor may also be a third type instruction; the third type instruction is an R-type instruction (indicated by opcode being a fixed value [0110011]), and is a data moving instruction (indicated by func3 being a fixed value [000]); and the type of the data moving instruction corresponding to the instruction is ④ (indicated by a code of func7 according to the present disclosure). At least some bits in the destination register of the instruction indicate the credit number as described above in the present disclosure, and at least some bits in the second source register in the instruction indicate the DMA ID as described above in the present disclosure. The number of requests for data stored in the corresponding DMA may be read through the instruction. For convenience of description, the first type instruction here is recorded as instruction 1 hereinafter, and the third type instruction is recorded as instruction 3.

The SCIE decoder includes a first instruction decoder, and instruction 1 or instruction 3 output by the coprocessor is transmitted to the first instruction decoder. The first instruction decoder is configured to perform first layer decoding on instruction 1 or instruction 3, to judge whether the instruction output by the coprocessor is a preset type and whether the output instruction is a read instruction or a write instruction. Exemplarily, the first instruction decoder may be configured to judge whether the instruction output by the coprocessor is an R-type data moving instruction. In the example, the first instruction decoder decodes the opcode field and the func3 field in instruction 1 or instruction 3, to obtain instruction 1 or instruction 3 which is an R-type data moving instruction. The first instruction decoder may further be configured to determine whether the instruction is a read instruction or a write instruction; if a decoding result of the first instruction decoder is that the instruction output by the coprocessor is a data moving instruction of type ① or ② or ③ as described above in the present disclosure, the instruction is a write instruction; and if a decoding result of the first instruction decoder is that the instruction output by the coprocessor is a data moving instruction of type ④ or ⑤ as described above in the present disclosure, the instruction is a read instruction. In the example, the first instruction decoder decodes the func7 field in instruction 1 or instruction 3, to obtain that instruction 1 is a write instruction and instruction 3 is a read instruction.

The SCIE decoder may further include an instruction first-in-first-out (FIFO) queue and a credit number decoder; if the decoding result of the first instruction decoder is that the instruction output by the coprocessor is a preset type and the output instruction is a write instruction, the decoded instruction is written into the instruction FIFO; and if the decoding result of the first instruction decoder is that the instruction output by the coprocessor is a preset type and the output instruction is a read instruction, a numerical value of a credit number counter in the DMA is read according to the decoded read instruction. Exemplarily, after the first instruction decoder decodes the func7 field in instruction 1, the decoded instruction 1 may be written into the instruction FIFO; and after the first instruction decoder decodes the func7 field in instruction 3, the SCIE decoder may read the numerical value of the credit number counter in the DMA according to the decoded instruction 3, and decode the read credit number through the credit number decoder, so as to obtain the number of writable write instructions in one or more channels in the DMA (i.e., the number of requests for data as described in the present disclosure).

In the coprocessor clock domain, every time a write instruction is written into the instruction FIFO, the credit number counter in DMA may be controlled to subtract 1. For example, when decoded instruction 1 is written into the instruction FIFO, the credit number counter may be controlled to subtract 1.

The SCIE decoder further includes a second instruction decoder, and the instruction FIFO may transmit decoded the instruction 1 to the second instruction decoder. The second instruction decoder may perform second layer decoding on the instruction, to judge which DMA the instruction is transmitted to. In the example, the second instruction decoder decodes the field indicating the DMA ID in the instruction 1, to obtain a signal indicating which DMA the instruction 1 will be written into. The DMA in FIG. 2 is determined according to the DMA ID having been decoded. After the second instruction decoder decodes the instruction 1, decoded instruction 1 may be transmitted to a third instruction decoder.

The DMA in FIG. 2 is located in the NPU clock domain, and the third instruction decoder (e.g., which may correspond to the second decoding circuit according to the present disclosure) is located in the DMA. Because the DMA and the coprocessor are located in different clock domains, the instruction FIFO in the SCIE decoder may use asynchronous FIFO to perform instruction synchronization. The third instruction decoder may perform third layer decoding on the instruction, to judge which channel in the DMA the instruction is written into. In the example, the third instruction decoder decodes a field indicating the channel ID in the instruction 1, to obtain which channel in the DMA the instruction 1 will be written into.

The DMA further includes an instruction writing control circuit and an instruction virtual channel storage circuit. The instruction virtual channel storage circuit includes a storage region corresponding to each channel. As illustrated in FIG. 2, the DMA includes a total of eight channels channel 1, channel 2, channel 3, channel 4, channel 5, channel 6, channel 7, and channel 8, and each channel corresponds to the GLB as described above in the present disclosure. The DMA is configured to move data to the GLB respectively on a corresponding channel. The instruction virtual channel storage circuit includes eight storage regions, and each storage region is configured to store a write instruction on a corresponding channel. For example, if the DMA is configured to move data to GLB #1 on channel 1, storage region #1 stores a write instruction on channel 1; if the DMA is configured to move data to GLB #2 on channel 2, storage region #2 stores a write instruction on channel 2, and so on. The instruction writing control circuit is configured to write a decoded instruction into a storage region of a corresponding channel in the instruction virtual channel storage circuit according to the decoding result of the third instruction decoder. For example, if the decoding result of the third instruction decoder is channel 1, the instruction writing control circuit may write decoded instruction 1 into storage region #1 corresponding to channel 1 in the instruction virtual channel storage circuit.

In an optional example, the instruction writing control circuit may control a write address. A start address and an end address of each storage region in the instruction virtual channel storage circuit may be configured through a configuring circuit in the DMA. In the example, the configuring circuit is located in an Advanced Peripheral Bus (APB) clock domain, and interacts through an APB interface. If the instruction writing control circuit successfully writes an instruction from a write address in a storage region, the instruction writing control circuit may control the write address to add 1, so as to facilitate writing an instruction from a next write address in the storage region next time. When the write address reaches the end address of the storage region, the instruction writing control circuit may control the write address to flip, so as to facilitate writing an instruction from the start address of the storage region next time.

In an optional example, the instruction writing control circuit may further judge whether the storage region of the corresponding channel in the instruction virtual channel storage circuit is full. If the storage region of the corresponding channel is full (i.e., there is no address space for further storing any write instruction), a signal indicating that the corresponding channel is full is output; optionally, if the storage region of the corresponding channel is full and there is still a write request, an error signal is output. If the storage region of the corresponding channel is not full (i.e., there is an address space for further storing a write instruction), a write enable signal (recorded as wr_en) is output, and the instruction virtual channel storage circuit may write the decoded instruction into the storage region of the corresponding channel according to the write enable signal. For example, if the decoding result of the third instruction decoder is channel 1 and the instruction writing control circuit outputs the write enable signal, the instruction writing control circuit may write decoded instruction 1 into storage region #1 corresponding to channel 1 in the instruction virtual channel storage circuit. So far, the DMA has completed writing the instruction 1, and a data flow of writing the instruction 1 into the instruction virtual channel storage circuit is as illustrated by a dotted line α in FIG. 2.

A reading procedure of the instruction 1 will be further illustrated below in conjunction with FIG. 2.

The DMA further includes a Round Robin scheduling circuit and an instruction reading control circuit. The Round Robin scheduling circuit is configured to determine which channel in the instruction virtual channel storage circuit a write instruction is read and written from, and the Round Robin scheduling circuit may generate a channel tag signal (ch_tag) and transmit the channel tag signal to the instruction reading control circuit. The instruction reading control circuit reads the write instruction of the corresponding channel in the instruction virtual channel storage circuit according to the channel tag. For example, the instruction 1 is written into storage region #1 corresponding to channel 1 in the instruction virtual channel storage circuit, and if a signal generated by the Round Robin scheduling circuit is a channel 1 tag signal, the instruction reading control circuit may read the instruction 1 from storage region #1.

The instruction reading control circuit may control a read address. A start address and an end address of each storage region in the instruction virtual channel storage circuit may be configured through the configuring circuit in the DMA. If the instruction reading control circuit successfully reads an instruction from a read address in a storage region, the instruction reading control circuit may control the read address to add 1, so as to facilitate reading an instruction from a next read address in the storage region next time. When the read address reaches the end address of the storage region, the instruction reading control circuit may control the read address to flip, so as to facilitate reading the instruction from the start address of the storage region next time.

In an optional example, the instruction reading control circuit may further judge whether the storage region of the corresponding channel in the instruction virtual channel storage circuit is empty according to the channel tag signal. If there is no readable instruction in the storage region of the corresponding channel, a signal indicating that the instruction is empty is returned; optionally, if the storage region of the corresponding channel is empty and there is still a read request, an error signal is output; and if there is a readable instruction in the storage region of the corresponding channel, a read enable signal (recorded as rd_en) is returned, and the Round Robin scheduling circuit may select a channel for the instruction to be read according to the read enable signal.

Every time successfully reading one instruction from the instruction virtual channel storage circuit, the instruction reading control circuit may control the credit number counter to add 1. Exemplarily, every time successfully reading one instruction, the instruction reading control circuit may generate a credit number add signal (recorded as credit_add), and then synchronize the credit_add signal to the credit number counter through a synchronizer, so that a numerical value of the credit number counter is added by 1. In the example in FIG. 2, the size of available space of the storage region in the instruction virtual channel storage circuit may be reflected in real time by dynamically adjusting the numerical value of the credit number counter, which reduces an error rate of instruction writing and improves performance of the NPU system.

The DMA further includes an AXI interface control circuit, the Round Robin scheduling circuit is controlled by a handshaking signal of a post-stage circuit (e.g., the GLB) fed back by the AXI interface control circuit and an AXI handshaking signal, and these handshaking signals are used to indicate a state of a channel and switch time. Exemplarily, if data moving is being performed on current channel 1, which indicates that the current channel 1 is not idle, then no signal for handshaking (e.g., valid AXI request) will be generated on channel 1; if data moving task has been completed on the current channel 1 or the current channel 1 is idle, channel 1 may generate a signal for handshaking. Exemplarily, if the current AXI interface control circuit is performing data processing (which will be described in detail below), no signal for handshaking (e.g., valid AXI request) will be generated; and if the current AXI interface control circuit is idle, it may generate a signal for handshaking.

The instruction reading control circuit may read an instruction from the instruction virtual channel storage circuit to the AXI interface control circuit; after receiving the instruction read from the instruction virtual channel storage circuit, the AXI interface control circuit will perform fourth layer decoding on the instruction, for extracting data content required by a post-stage circuit of the AXI interface control circuit (e.g., the GLB) and performing a conversion operation according to the extracted data content, while simultaneously generating an AXI request corresponding to the extracted data content. In the example, after receiving the instruction 1, the AXI interface control circuit decodes the fields indicating the offset address information and the length information in the instruction 1, to obtain address information of the data to be moved, and then the AXI interface control circuit performs operations such as burst length control, cross 4K address check, etc. according to the address information of the data to be moved, and meanwhile, generates a corresponding AXI request. So far, the DMA has completed reading the instruction 1 and converting the instruction 1 into the AXI request recognizable by the NPU system. In another example, the data content required by a post-stage circuit of the AXI interface control circuit (e.g., the GLB) may be an instruction. In this case, the AXI interface control circuit may send the instruction to the post-stage circuit of the AXI interface control circuit without generating any AXI request after performing fourth layer decoding and a conversion operation on the instruction.

The DMA may transmit the AXI request to the Network on Chip, and the Network on Chip, according to the AXI request, may read the data to be moved from the SRAM and perform data moving, or may read the data to be moved from the DRAM and perform data moving. A data flow of moving the data from the SRAM or the DRAM to the GLB of the corresponding channel is as illustrated by a dotted line γ in FIG. 2.

The DMA further includes an interrupt control circuit located in the APB clock domain. After transmission of all data and/or instructions to be moved is completed, the AXI interface control circuit may generate a transmission done signal (recorded as trans_done) to indicate task completed. The interrupt control circuit generates an interrupt signal and outputs the same according to the received transmission done signal. The DMA further includes a performance monitor located in the APB clock domain, configured to test DMA performance.

Figure 3:
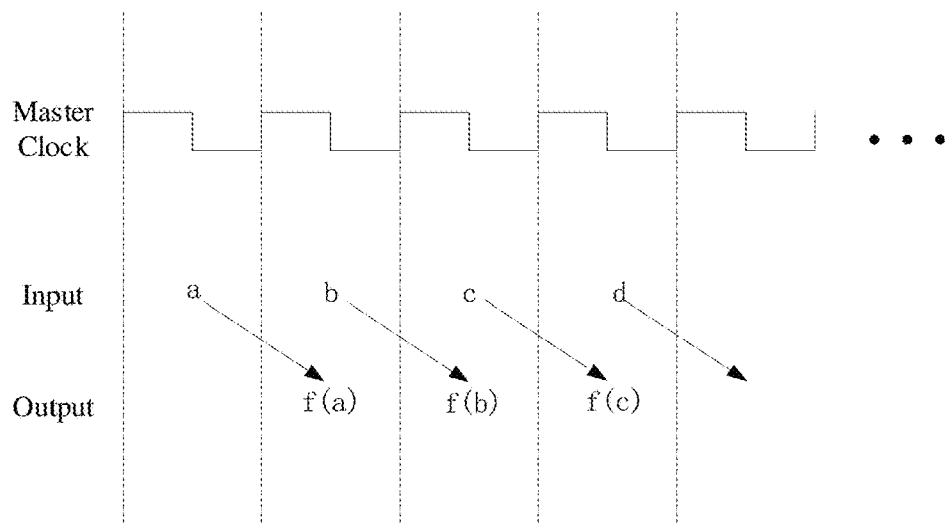
FIG. 3 illustrates an example of an operation timing chart for a timing chip.

Generally speaking, memory units such as registers, memories, counters, etc. used to store data in a computer are composed of timing chips. In a computer system, passage of time may be represented by a master clock, which supplies a consecutive alternating signal sequence that alternates between two signal values 0 and 1 (low level and high level); a time gap between two adjacent rising edges is referred to as a cycle/a beat of the clock, and the alternating signal may be transmitted to the timing chip by using a hardware circuit. FIG. 3 illustrates an example of an operation timing chart for a timing chip. As illustrated in FIG. 3, for a timing chip, an output of time t depends on an input of time t−1, that is:

$$\text{out}[t]=\text{function}(\text{in}[t-1])$$

Because the instruction virtual channel storage circuit in the DMA in FIG. 2 adopts the above-described timing chip, there will be one beat of latency between a read request and a read data for the instruction virtual storage circuit, resulting in latency introduced when the Round Robin scheduling circuit switches between channels.

Data transmission may be implemented through a handshaking signal, and handshaking refers to that a source and a destination each send out a control signal, to inform the other party of its own situation. For example, when a receiver (destination) may receive data at its own, it may actively send a request signal to a sender (source) to inform the sender that data may be sent. After receiving the request signal, the sender sends the data onto a data bus and sends a response signal, to inform the receiver that the data is ready; and after the receiver takes away the data, it cancels the request signal, and the sender also cancels the response signal. For convenience of description, in the present disclosure, when the receiver needs data, the request signal input to the sender is a ready signal, and the signal sent by the sender to inform the receiver that the data is ready is a valid signal. When the ready signal is valid and the valid signal is valid, the sender sends the data to the receiver.

The DMA in FIG. 2 may move data or instructions to eight Global Buffer (GLB) clusters in the NPU system on, for example, eight channels, for example, move data or instructions on channel 1 to GLB cluster 1, and move data or instructions on channel 2 to GLB cluster 2, and so on. In the example, the GLB cluster may serve as a receiver to send a ready signal to the DMA, and the DMA as a data sender may send a valid signal to the GLB cluster when the data or the instruction is ready. The ready signal sent by the GLB cluster may be recorded as GLB_instr_ready, and the valid signal sent by the DMA may be recorded as Ar_valid.

The DMA in FIG. 2 may convert the instruction output by the coprocessor into, for example, an AXI request conforming to the Advanced eXtensible Interface (AXI) bus protocol, and send the AXI request to the Network on Chip (NoC); and the Network on Chip moves data from a storing apparatus (e.g., a Dynamic Random Access Memory (DRAM) or a Static Random Access Memory (SRAM)) to the GLB cluster according to the AXI request. In the example, the Network on Chip as a receiver may send a ready signal to the DMA, the DMA may serve as a sender to send a valid signal when the AXI request is ready, the ready signal supplied to the DMA by the Network on Chip through the AXI interface may be recorded as Ar_ready, and the valid signal sent by DMA through the AXI interface may be recorded as Ar_valid.

Figure 4A:
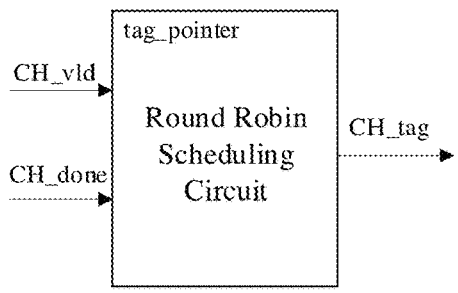
FIG. 4A and FIG. 4B illustrate an operation mechanism of a Round Robin scheduling circuit in the DMA illustrated in FIG. 2.
Figure 4B:
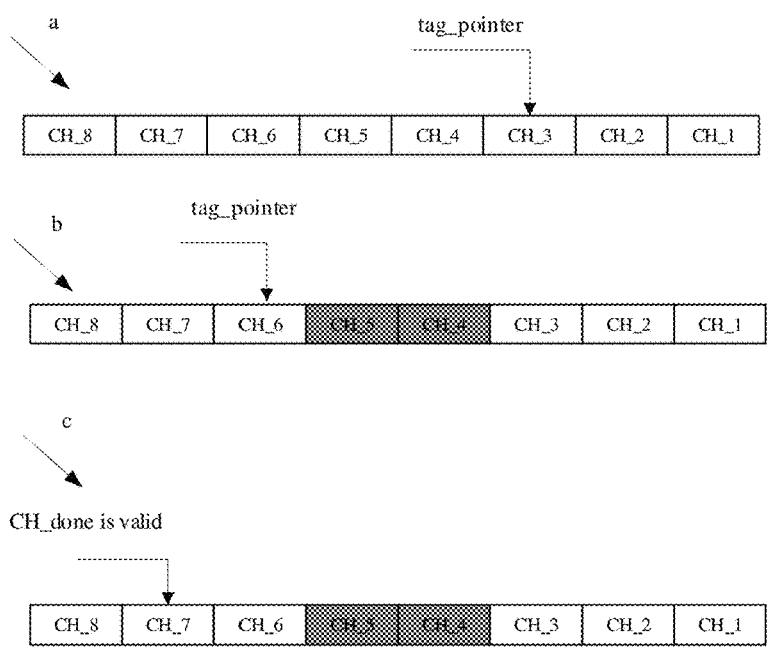

The instruction virtual channel storage circuit of the DMA in FIG. 2 may include eight storage regions, each storage region is configured to store instruction data on one channel, the Round Robin scheduling circuit may output a channel tag, and the instruction reading control circuit may read the instruction from the storage region of the corresponding channel according to the channel tag. FIG. 4A and FIG. 4B illustrate an operation mechanism of the Round Robin scheduling circuit in the DMA illustrated in FIG. 2.

As illustrated in FIG. 4A, the Round Robin scheduling circuit includes a channel tag pointer tag_pointer, which plays a role in Round Robin channel priority switching, and has a default value of 1, that is, points to channel 1 (CH_1). An input signal of the Round Robin scheduling circuit may include a CH_done signal and a CH_vld signal. The CH_done signal is used to indicate a channel state; when the CH_done signal is valid, it indicates that the DMA has successfully sent the data or the instruction on the channel. The CH_vld is used to indicate whether the channel is valid. When the CH_vld signal is valid, it indicates that the channel is valid; and when the CH_vld signal is invalid, it indicates that the channel is invalid. The CH_vld signal may be determined according to the GLB_instr_ready signal as described above. For example, when GLB_instr_ready is valid (i.e., the GLB cluster needs data) and there is instruction data, the CH_vld signal is valid; and when GLB_instr_ ready is invalid (i.e., the GLB cluster does not need data) or there is no instruction data, the CH_vld signal is invalid. In the example, when the Ar_ready signal and the Ar_valid signal are valid at a same time, the CH_done signal may be valid, otherwise, the CH_done signal is invalid. An output of the Round Robin scheduling circuit is the channel tag CH_tag.

As illustrated in FIG. 4B, in case a, tag_pointer points to a current channel CH_3 (i.e., channel 3); when the CH_done signal is valid, tag_pointer switching (e.g., switching in one beat) will be performed to switch to a next channel (whether the CH_vld signal of the channel is valid or not), and at this time, tag_pointer points to channel CH_4 (i.e., channel 4). In case b, if the CH_done signal is inconsecutive, tag_pointer will point to a current valid channel when the CH_done signal is invalid; because channel CH_4 (i.e., channel 4) and channel CH_5 (i.e., channel 5) are invalid channels, tag_pointer will jump to a next valid channel CH_6 (channel 6) and output a tag of channel 6; and in case c, if the CH_done signal is consecutive, tag_pointer will perform tag_pointer switching when the CH_done signal is valid, to switch to a next channel CH_7 (channel 7).

Latency of the Round Robin scheduling circuit when switching between channels according to the present disclosure will be described below in conjunction with FIG. 5.

Figure 5:
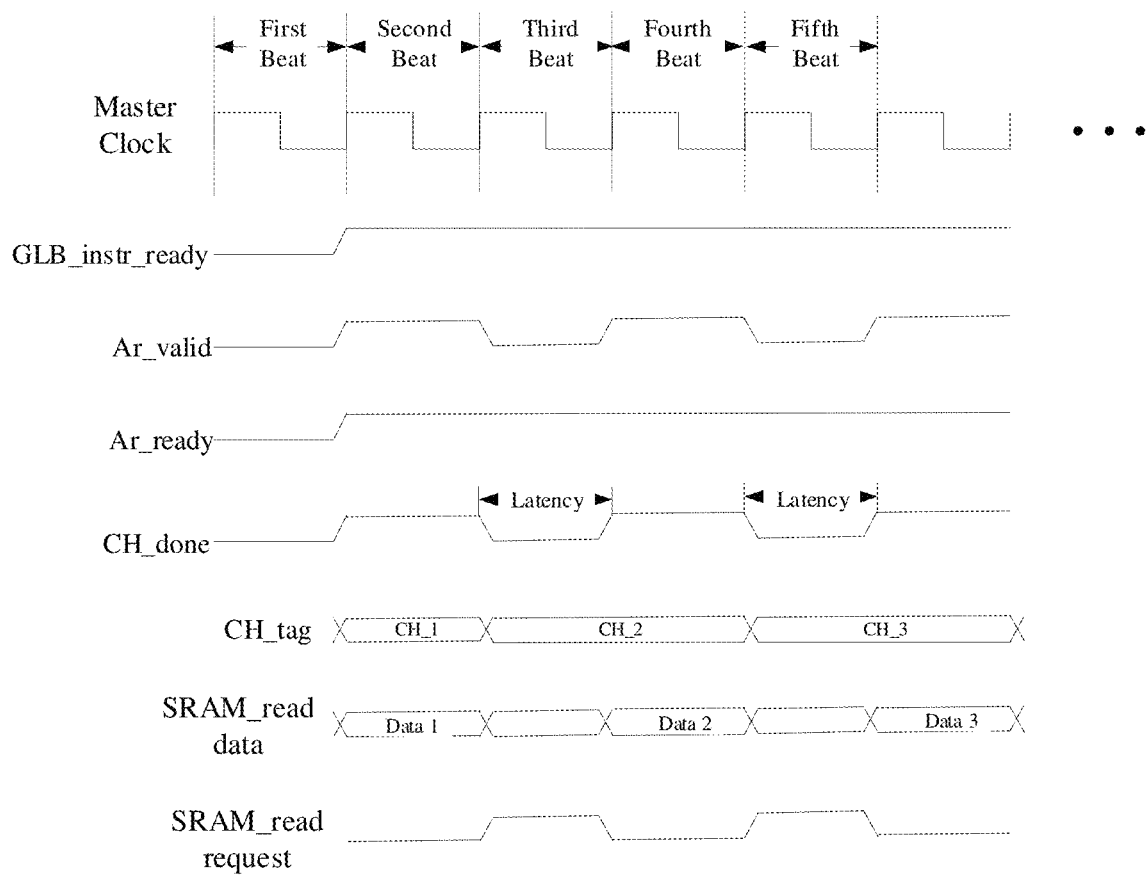
FIG. 5 illustrates latency when a Round Robin scheduling circuit switches between channels according to an embodiment of the present disclosure.

As illustrated in FIG. 5, GLB_instr_ready is a ready signal of a post-stage circuit of the DMA in FIG. 2; when GLB_instr_ready is pulled down, GLB_instr_ready will back press the DMA; Ar_ready and Ar_valid are handshaking signals between the DMA and the Network on Chip in FIG. 2, when Ar_ready and Ar_valid are simultaneously high, it represents that a current request transmission is completed; CH_done is a channel switching signal of the Round Robin scheduling circuit of the DMA in FIG. 2, if it is detected that CH_done is high at a rising edge of the master clock, channel switching is performed; CH_tag is an output signal of the Round Robin scheduling circuit of the DMA in FIG. 2, and represents which channel is currently selected; SRAM_read data is data read by the instruction reading control circuit in FIG. 2 from the instruction virtual channel storage circuit, when the data is read into the AXI interface control circuit, it may approximately represent that the DMA in FIG. 2 is ready for instruction data, and at this time, the Ar_valid signal is pulled up; and SRAM_read request is a read request for the instruction virtual channel storage circuit of the DMA in FIG. 2.

If the post-stage circuit of the DMA and the Network on Chip in FIG. 2 are constantly in a ready state (i.e., GLB_instr_ready and Ar_ready in FIG. 5 are constantly high after a second beat of the master clock), in the second beat, Ar_valid being high represents that the AXI interface control circuit of the DMA in FIG. 2 has had data 1 ready, and meanwhile, Ar_ready is high, so the current channel has completed a data transmission in the second beat, at this time, CH_done being pulled up represents that the current channel has completed a data transmission and needs to switch to a next channel, and the channel tag Ch_1 is output in the second beat. It is detected that CH_done is high on a rising edge in a third beat, the Round Robin scheduling circuit executes channel switching, that is, switching from channel CH_1 to channel CH_2; and meanwhile, in the third beat, the instruction reading control circuit of the DMA in FIG. 2 receives the channel tag Ch_1, the SRAM_read request is high, it starts to read data 2 from channel 1 in the instruction virtual channel storage circuit of the DMA in FIG. 2, and read data 2 into the AXI interface control circuit of the DMA in FIG. 2 in a next beat. Because data 2 has not been read from the instruction virtual channel storage circuit of the DMA in FIG. 2 in the third beat, the DMA in FIG. 2 has not had data ready, at this time, Ar_valid is pulled down. Because data transmission has not been completed on the current channel CH_2 in the third beat, CH_done is pulled down, that is, CH_done is pulled down while Ar_valid is pulled down, resulting in one beat of latency on the current channel CH_2. In the fourth beat, the data is successfully read out of the instruction virtual channel storage circuit of the DMA in FIG. 2, Ar_valid is pulled up, and meanwhile Ar_ready is high, so the current channel CH_2 has completed a request transmission in the fourth beat, and CH_done being pulled up represents that the current channel CH_2 has completed a data transmission and needs to switch to a next channel CH_3. Processing by the DMA in FIG. 2 after the fifth beat is similar to that from the second beat to the fourth beat, and no details will be repeated here.

It may be seen from the above description in conjunction with FIG. 5 that latency between signal reading and data reading of the instruction virtual channel storage circuit in the DMA in FIG. 2 causes latency generated when the Round Robin scheduling circuit of the DMA switches between channels, which leads to failure of pipeline processing and reduces efficiency.

In order to solve the above-described technical problems, the present disclosure proposes an optimization solution for the DMA in FIG. 2, to implement pipeline processing during channel switching.

Figure 6A:
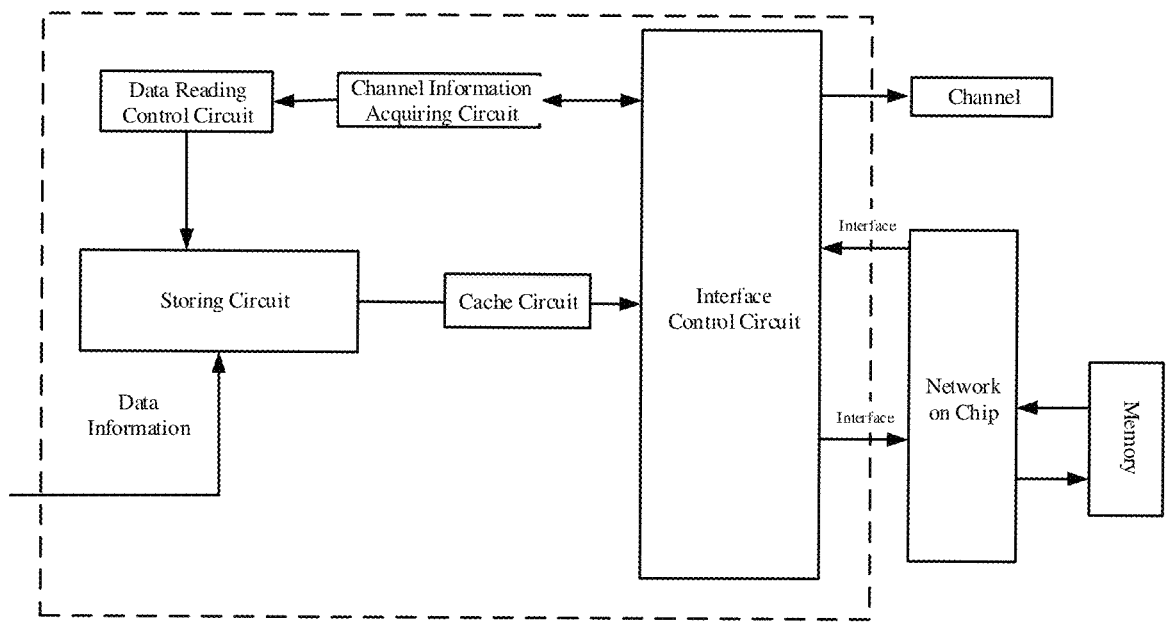
FIG. 6A illustrates a structural schematic diagram of a processing apparatus for executing data processing on a plurality of channels according to at least one embodiment of the present disclosure.

FIG. 6A illustrates a structural schematic diagram of a processing apparatus for executing data processing on a plurality of channels according to at least one embodiment of the present disclosure.

As illustrated in FIG. 6A, the processing apparatus configured to execute data processing on a plurality of channels includes a channel information acquiring circuit, which is configured to acquire channel information of the plurality of channels; a storing circuit, including a plurality of storage regions corresponding to the plurality of channels, in which the storage regions are configured to store data information for the plurality of channels; a data reading control circuit, which is configured to read target data information corresponding to the channel information from a target storage region among the plurality of storage regions of the storing circuit, according to the channel information; and a cache circuit, which is configured to pre-store the target data information read from the target storage region of the storing circuit, by the data reading control circuit, to wait for use in data processing. In the example, the data information may be the R-type instruction as described above in the present disclosure, the storing circuit may be the instruction virtual channel storage circuit as described in the present disclosure, and the data reading control circuit may be the instruction reading control circuit or the instruction reading control unit as described in the present disclosure. In the example, the channel information may be the data channel corresponding to the GLB cluster as described in the present disclosure. In the example, the interface control circuit may be the AXI interface control circuit or the AXI interface control unit as described in the present disclosure. It should be understood that although the processing apparatus illustrated in FIG. 6A that is configured to execute data processing on the plurality of channels includes the interface control circuit, yet if a post-stage circuit of the processing apparatus needs data information, the cache circuit may directly output the data information to the post-stage circuit of the processing apparatus without the interface control circuit in between. In other words, the interface control circuit illustrated in FIG. 6A is not a necessary functional circuit of the processing apparatus.

Figure 6B:
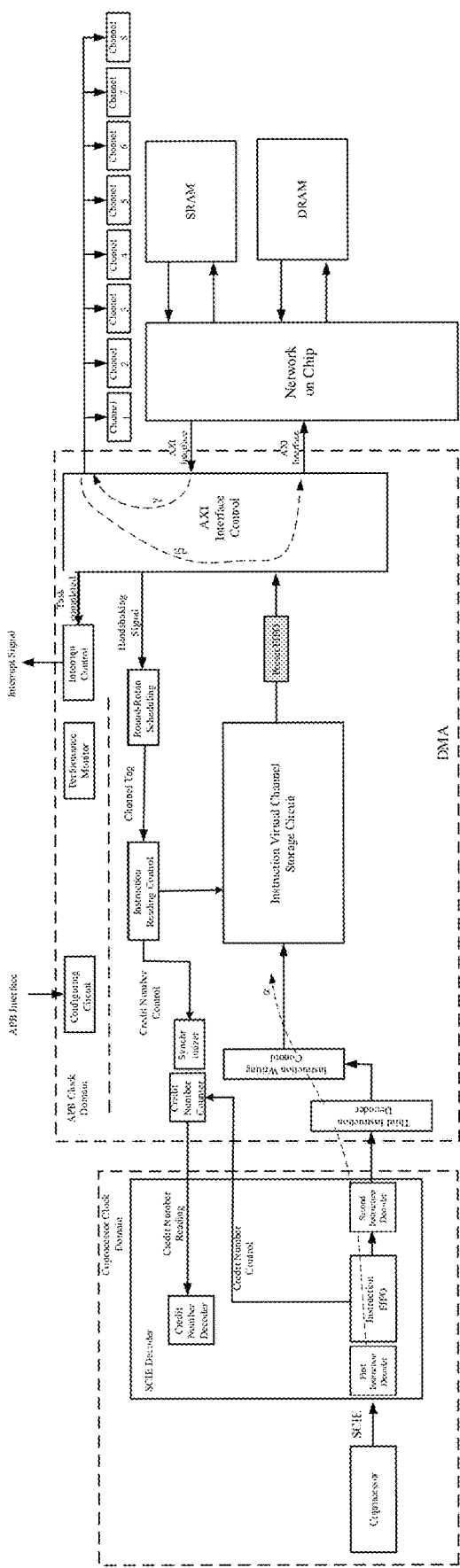
FIG. 6B illustrates an exemplary architecture of a coprocessor-based DMA according to at least one embodiment of the present disclosure.

FIG. 6B illustrates an exemplary architecture of a coprocessor-based DMA according to at least one embodiment of the present disclosure.

As illustrated in FIG. 6B, as compared with the DMA illustrated in FIG. 2, the architecture of the DMA according to the present embodiment has a preset first-in-first-out (FIFO) queue inserted between the instruction virtual channel storage circuit and the AXI interface control circuit, and the preset FIFO is configured to pre-store instructions of the channel. Through the preset FIFO, instructions of different channels may be pre-fetched, so as to reduce or eliminate latency caused by reading data in the instruction virtual channel storage circuit.

According to an example of this embodiment, the preset FIFO may be a FIFO that adopts the above-described timing chip, that is, there will be one beat of latency between a read request and read data of the preset FIFO. An example of an operation timing chart of the DMA architecture according to the present disclosure will be described below in conjunction with FIG. 7 and FIG. 8.

Figure 7:
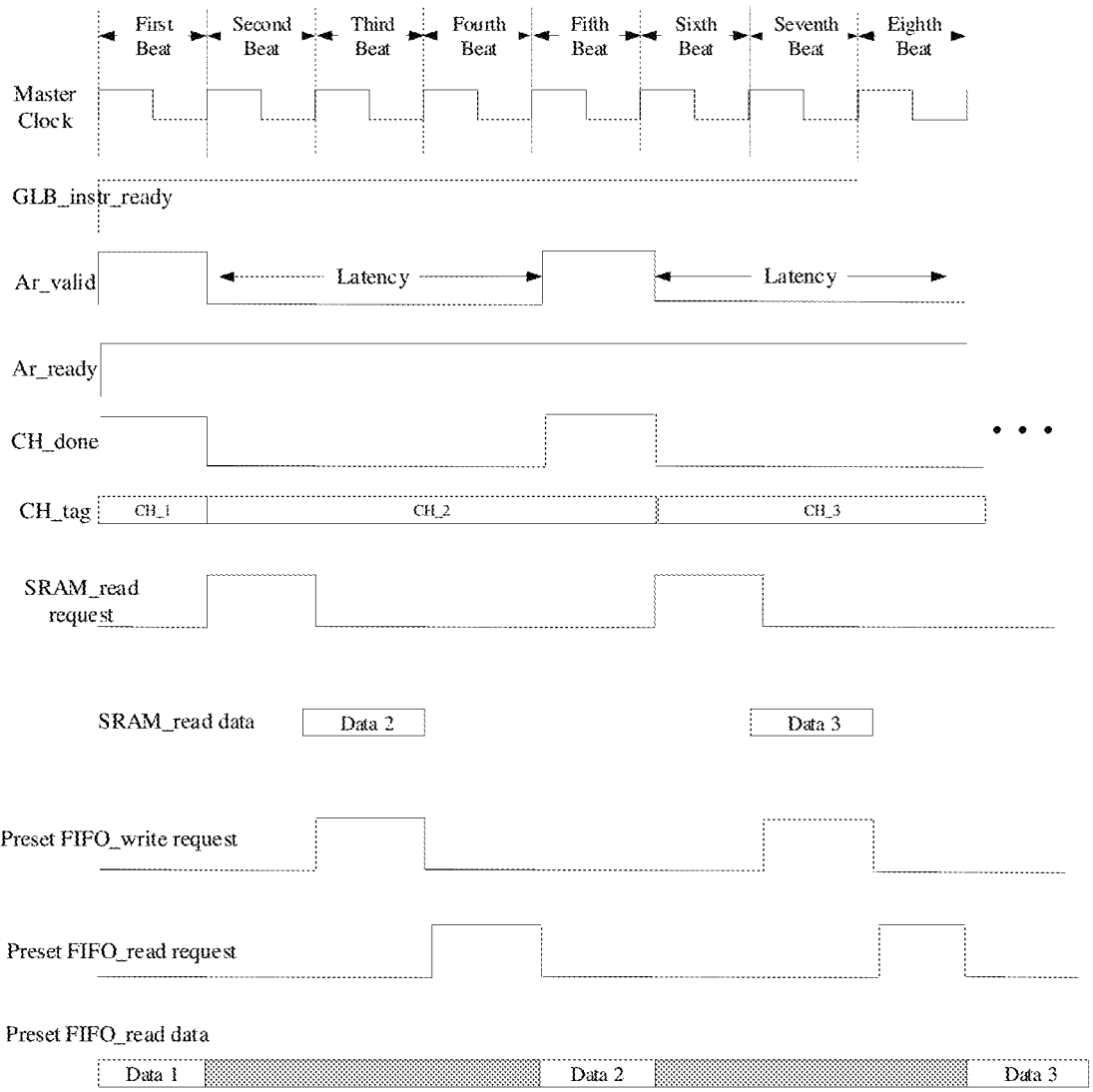
FIG. 7 illustrates an example of a DMA operation timing chart without pre-fetching an instruction for preset FIFO (first in first out) according to an embodiment of the present disclosure.

FIG. 7 illustrates an example of a DMA operation timing chart without pre-fetching an instruction for the preset FIFO according to this embodiment.

As illustrated in FIG. 7, if the post-stage circuit of the DMA and the Network on Chip in FIG. 6B are constantly in a ready state (i.e., GLB_instr_ready and Ar_ready in FIG. 7 are constantly high), in the first beat, because the DMA has had data 1 ready, Ar_valid is high; because Ar_valid and Ar_ready are simultaneously high in the first beat, CH_done is high, the Round Robin scheduling circuit in the DMA outputs channel tag CH_1, and at the same time, switches the channel to channel CH_2. In the second beat, the instruction reading control circuit in the DMA receives channel tag CH_1 sent by the Round Robin scheduling circuit, so the SRAM_read request signal is pulled up in the second beat; because data 2 has not been read into the preset FIFO in the second beat (corresponding to SRAM_read data in FIG. 7 being low in the second beat), the DMA has not had data ready, and Ar_valid is pulled down; because the DMA has not successfully sent data on the channel in the second beat, CH_done is pulled down. In the third beat, according to preset FIFO_write request, data 2 is read from channel 1 in the instruction virtual channel storage circuit of the DMA into the preset FIFO; because data 2 has not been read from the preset FIFO into the AXI interface control circuit of the DMA in the third beat, that is, the DMA has not had data ready in the third beat, Ar_valid continues to be low; because the DMA has not successfully sent data on the channel in the third beat, CH_done continues to be low. In the fourth beat, according to preset FIFO_read request, data 2 is read from the preset FIFO into the AXI interface control circuit of the DMA, and data 2 is successfully read into the AXI interface control circuit of the DMA in a next beat, similarly, Ar_valid and CH_done continue to be low. In the fifth beat, the DMA has had data 2 ready, so Ar_valid is pulled up; because Ar_valid and Ar_ready are simultaneously high in the fifth beat, CH_done is high, the Round Robin scheduling circuit in the DMA outputs channel tag CH_2, and at the same time, switches the channel to channel CH_3. In the sixth beat, the instruction reading control circuit in the DMA receives channel tag CH_2 sent by the Round Robin scheduling circuit, so SRAM_read request is pulled up in the sixth beat; data 3 has not been read into the preset FIFO in the sixth beat, so the DMA has not had data ready, and Ar_valid is pulled down; because the DMA has not successfully sent data on the channel in the sixth beat, CH_done is pulled down. In the seventh beat, according to preset FIFO_write request, data 3 is read from channel 2 in the instruction virtual channel storage circuit of the DMA into the preset FIFO; data 3 has not been read from the preset FIFO into the AXI interface control circuit of the DMA in the seventh beat, that is, the DMA has not had the data ready in the seventh beat, so Ar_valid continues to be low; because the DMA has not successfully sent data on the channel in the seventh beat, CH_done continues to be low. In the eighth beat, according to preset FIFO_read request, data 3 is read from the preset FIFO into the AXI interface control circuit of the DMA, and data 3 is successfully read into the AXI interface control circuit of the DMA in a next beat, similarly, Ar_valid and CH_done continue to be low, and so on.

It may be seen from the description in FIG. 7 that in the case where the preset FIFO according to the present disclosure adopts the timing chip as described above, the DMA illustrated in FIG. 6B will introduce at least three beats of latency when switching between different channels.

The preset FIFO according to the present disclosure may also be a memory adopting combined logic, which may implement occurrence of a read request and read data in the same beat, thereby saving one beat of latency. An example of the preset FIFO according to the present disclosure will be described below in conjunction with FIG. 8.

Figure 8:
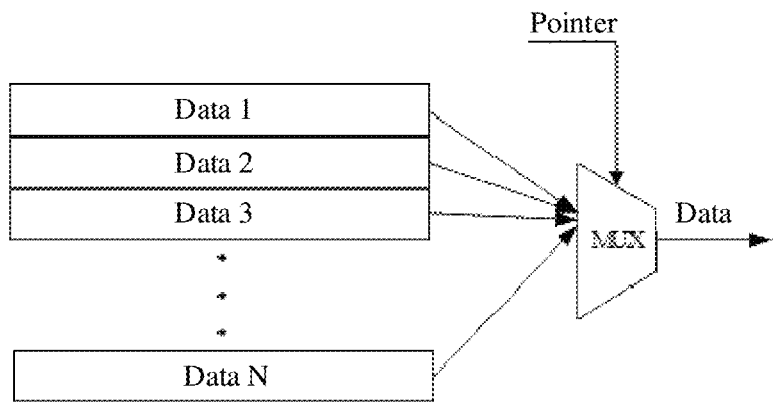
FIG. 8 illustrates an example of preset FIFO according to the present disclosure.

As illustrated in FIG. 8, the preset FIFO includes a Multiplexer (MUX) and N storage addresses; each row represents a storage address; data 1, data 2, . . . , and data N are each stored at a corresponding storage address; each storage address is coupled to the MUX; a selection terminal of the MUX is a pointer of the preset FIFO; the default value of the pointer is an address pointing to data 1; when a read request is received, the pointer is valid, the MUX outputs data 1, and meanwhile the pointer is added by 1; if the read request is received again, the pointer is valid again, the MUX outputs data 2, and meanwhile the pointer is added by 1, and so on. It should be understood that if the DMA in FIG. 6B adopts the preset FIFO as described in the present disclosure in conjunction with FIG. 8, the DMA will introduce at least two beats of latency when switching between different channels. On this premise, the present disclosure proposes to pre-fetch instruction data of at least one channel in the preset FIFO, so as to eliminate some or all latency as described in conjunction with FIG. 7.

Figure 9:
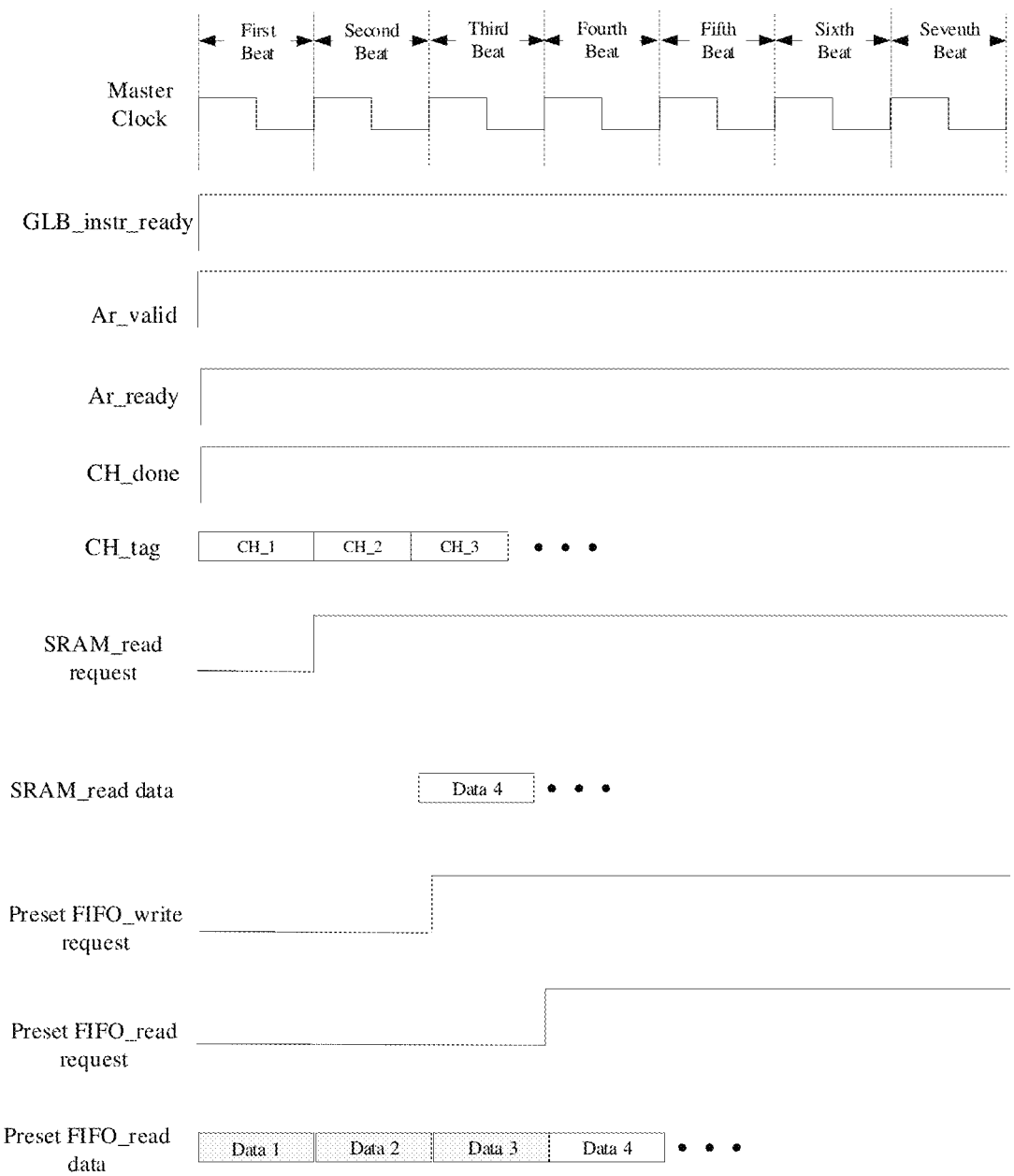
FIG. 9 illustrates an example of a DMA operation timing chart, in the case where instruction data of three different channels is pre-stored in the preset FIFO according to the present disclosure.

FIG. 9 illustrates an example of a DMA operation timing chart in the case where instruction data of three different channels is pre-stored in the preset FIFO according to the present disclosure. In the example, the preset FIFO is a memory adopting combined logic.

As illustrated in FIG. 9, data 1, data 2 and data 3 are data pieces of three different channels pre-fetched in the preset FIFO; if the post-stage circuit of the DMA and the Network on Chip in FIG. 6B are constantly in a ready state (i.e., GLB_instr_ready and Ar_ready in FIG. 9 are constantly high), because the instruction data pieces of the three different channels are pre-stored in the preset FIFO of the DMA, and a read request and read data of the preset FIFO occur at the same beat from the first beat to the third beat, Ar_valid is constantly high from the first beat to the third beat; because Ar_valid and Ar_ready are simultaneously high from the first beat to the third beat, CH_done is constantly high; the Round Robin scheduling circuit in the DMA implements pipeline switching, and outputs channel tags CH_1, CH_2 and CH_3 respectively in the first beat, the second beat and the third beat. In the second beat, the third beat and the fourth beat, the instruction reading control circuit in the DMA sequentially receives the channel tags CH_1, CH_2 and CH_3, so the SRAM_read request signal is constantly high from the second beat to the fourth beat. In the third beat, the fourth beat and the fifth beat, according to preset FIFO_write request, data 4, data 5 and data 6 (data 5 and data 6 not illustrated) are sequentially read from channel 1, channel 2 and channel 3 in the instruction virtual channel storage circuit of the DMA into the preset FIFO. In the fourth beat, the fifth beat and the sixth beat, according to preset FIFO_read request, data 4, data 5 and data 6 are sequentially read from the preset FIFO into the AXI interface control circuit of the DMA, and data 4, data 5 and data 6 are successfully read into the AXI interface control circuit of the DMA at the same beat, that is, the DMA has had data ready in the fourth beat, the fifth beat, and the sixth beat, so Ar_valid continues to be high from the fourth beat to the sixth beat, so that the DMA outputs instructions in a pipelining manner, which eliminates latency caused by switching between different channels.

In the present disclosure, by adding a preset FIFO instruction pre-storing mechanism to the DMA, instruction data is pre-fetched from the instruction virtual channel storage circuit of the DMA in FIG. 2 when other channels or the AXI interface control circuit of the DMA in FIG. 2 are busy, so as to eliminate latency of a read operation thereof.

In conjunction with the preset FIFO instruction pre-storing mechanism proposed in the present disclosure, latency of the read operation of the instruction virtual channel storage circuit is eliminated when the DMA in FIG. 6B switches between different channels; on the other hand, there will still be at least two beats of latency for the single-channel switching mode.

Figure 10:
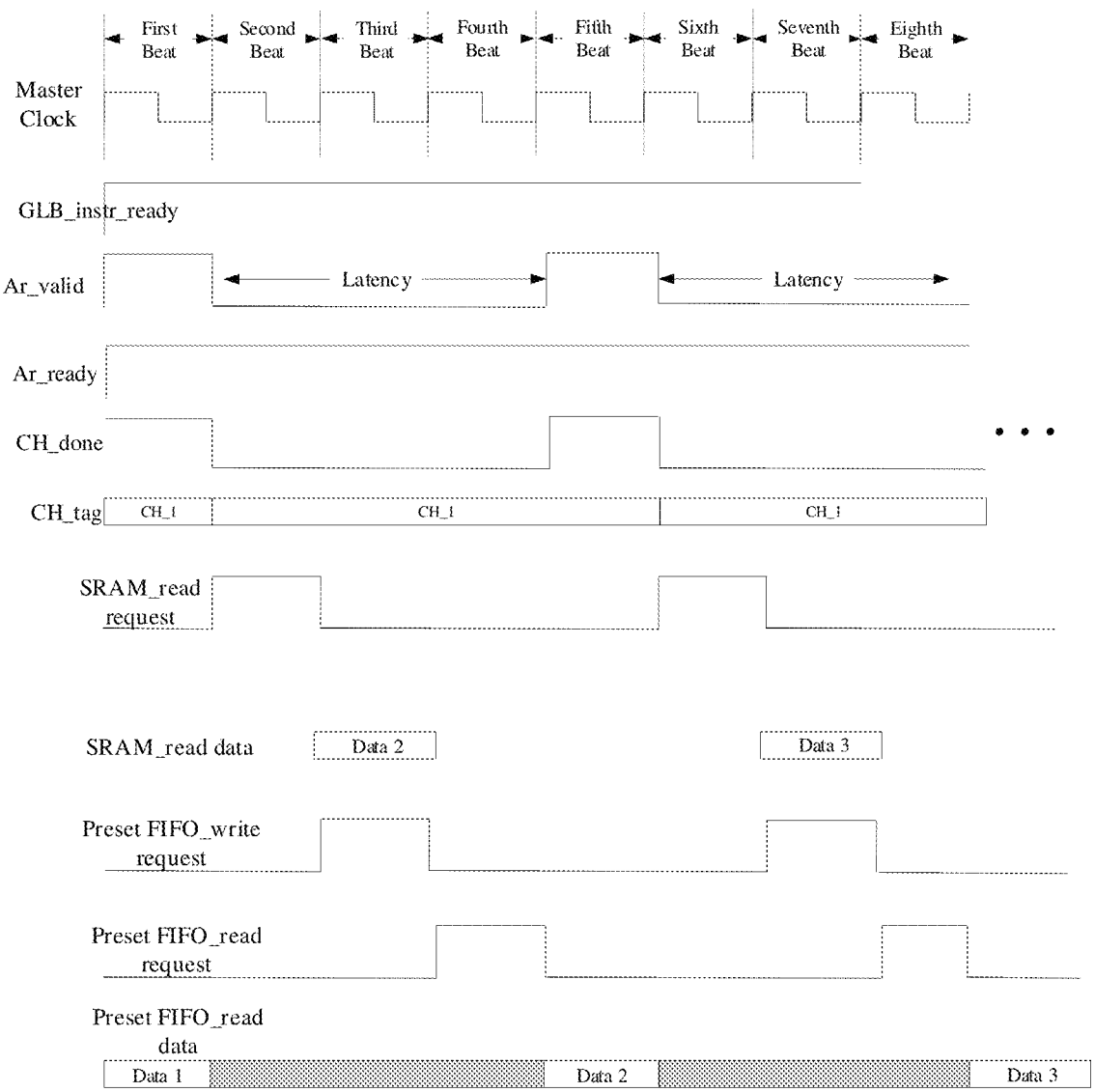
FIG. 10 illustrates an example of a DMA operation timing chart in a single-channel switching mode in FIG. 6B, by using a preset FIFO instruction pre-storing mechanism according to at least one embodiment of the present disclosure.

FIG. 10 illustrates an example of a DMA operation timing chart in a single-channel switching mode in FIG. 6B, by using a preset FIFO instruction pre-storing mechanism according to at least one embodiment of the present disclosure.

As illustrated in FIG. 10, in the first beat, because the DMA has had data 1 ready, Ar_valid is high; because Ar_valid and Ar_ready are simultaneously high in the first beat, CH_done is high; the Round Robin scheduling circuit in the DMA outputs channel tag CH_1, and at the same time, switches the channel to channel CH_1. In the second beat, the instruction reading control circuit in the DMA receives channel tag CH_1 sent by the Round Robin scheduling circuit, so the SRAM_read request signal is pulled up in the second beat. Because the current channel is still channel CH_1 (i.e., channel 1) from the second beat to the fifth beat, according to the Round Robin scheduling mechanism, switching may be performed only after completion of a data transmission on channel 1, that is, switching may be performed only until data 2 of channel 1 in the instruction virtual channel storage circuit of the DMA is successfully written into the AXI interface control circuit of the DMA according to channel tag CH_1 output in the first beat, so from the second beat to the fourth beat, the DMA cannot output the instruction data (the DMA successfully outputs data 2 in the fifth beat), thereby introducing at least three beats of latency. Operation timing of signals such as SRAM_read request, SRAM_read data, preset FIFO_write request, preset FIFO_read request, preset FIFO_read data, etc. is the same as the operation timing in FIG. 7 according to the present disclosure, and no details will be repeated here. In addition, even if the preset FIFO adopts the memory adopting combined logic according to the present disclosure, the DMA in FIG. 6B still has two beats of latency in the single-channel switching mode.

Based on the above-described embodiments, at least one embodiment of the present disclosure proposes another optimization solution for the DMA in FIG. 2, to implement pipeline processing during channel switching.

Figure 11A:
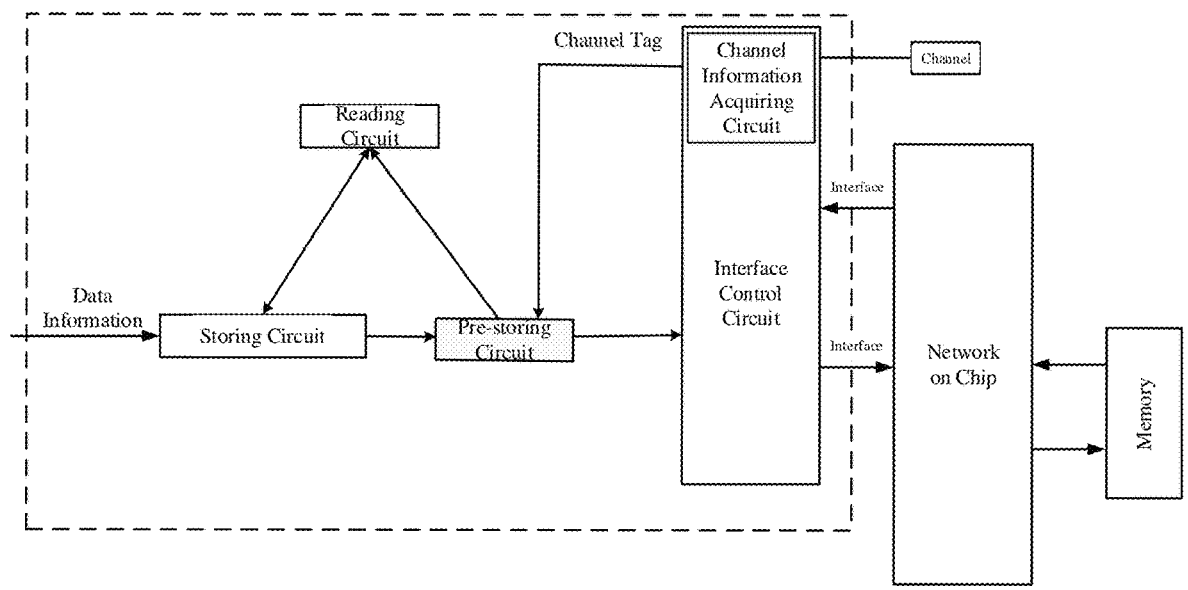
FIG. 11A illustrates a structural schematic diagram of a processing apparatus for executing data processing on a plurality of pieces of channel information according to at least one embodiment of the present disclosure.

FIG. 11A illustrates a structural schematic diagram of a processing apparatus for executing data processing on a plurality of pieces of channel information according to at least one embodiment of the present disclosure.

As illustrated in FIG. 11A, the processing apparatus for executing data processing on a plurality of pieces of channel information includes a channel information acquiring circuit, a storing circuit, a reading circuit, and a pre-storing circuit; the channel information acquiring circuit is configured to acquire target channel information among the plurality of pieces of channel information; the storing circuit includes a plurality of storage regions corresponding to the plurality of pieces of channel information, and each of the plurality of storage regions is configured to store data information for any one piece of channel information among the plurality of pieces of channel information; the reading circuit is configured to sequentially pre-store the data information from the plurality of storage regions of the storing circuit to the pre-storing circuit; and the pre-storing circuit is configured to pre-store the data information from the plurality of storage regions of the storing circuit to wait for use in data processing, and output the pre-stored target data information corresponding to the target channel information, according to the acquired target channel information, for use in data processing. In the example, the data information may be the R-type instruction as described in the present disclosure, the storing circuit may be the instruction virtual channel storage circuit as described in the present disclosure, the reading circuit may include the instruction reading control circuit or the instruction reading control unit as described in the present disclosure, and the reading circuit may further include the first Round Robin scheduling circuit or unit as described below in the present disclosure. In the example, the channel information may be the data channel corresponding to the GLB cluster as described in the present disclosure, and the channel information acquiring circuit may be the second Round Robin scheduling circuit or unit as described below in the present disclosure. In the example, the interface control circuit may be the AXI interface control circuit or the AXI interface control unit as described in the present disclosure. It should be understood that although the processing apparatus configured to execute data processing on the plurality of pieces of channel information illustrated in FIG. 11A includes an interface control circuit, yet if the post-stage circuit of the processing apparatus needs data information, the pre-storing circuit may directly output the data information to the post-stage circuit of the processing apparatus without the interface control circuit in between. In other words, the interface control circuit illustrated in FIG. 11A is not a necessary functional circuit of the processing apparatus.

Figure 11B:
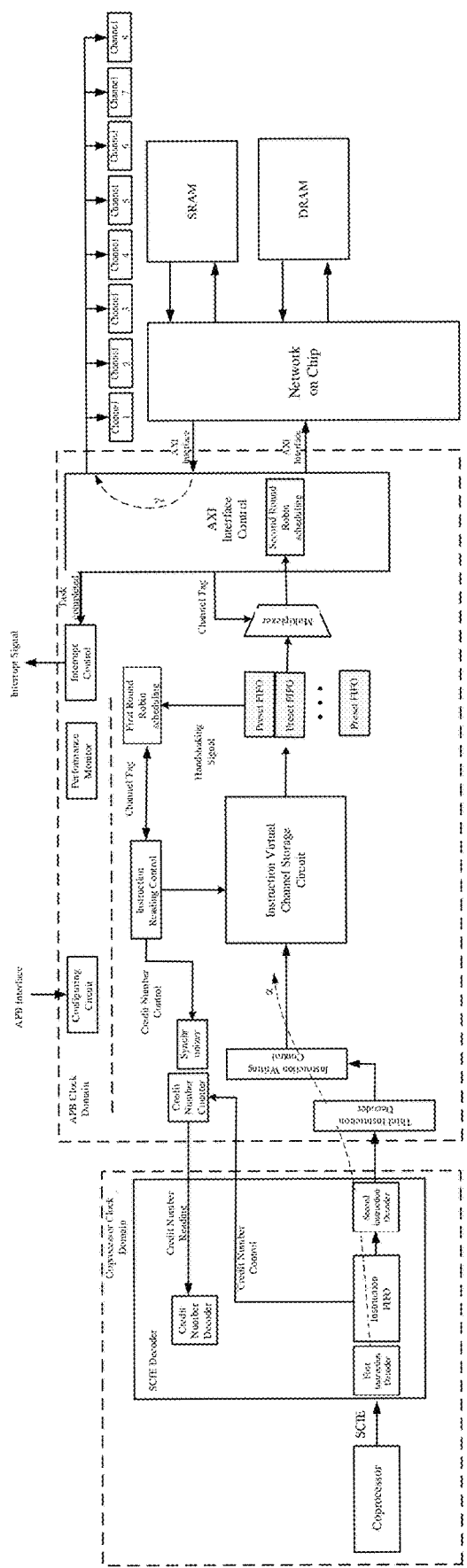
FIG. 11B illustrates an exemplary architecture of a coprocessor-based DMA according to at least one embodiment of the present disclosure.

FIG. 11B illustrates an exemplary architecture of a coprocessor-based DMA according to at least one embodiment of the present disclosure. As illustrated in FIG. 11B, as compared with the DMA illustrated in FIG. 2, in the architecture of the DMA according to the present disclosure, a plurality of preset FIFOs are inserted between the instruction virtual channel storage circuit and the AXI interface control circuit, and meanwhile, and a double Round Robin scheduling mechanism is introduced to implement separation of an operation of fetching instructions from the instruction virtual channel storage circuit from the post-stage circuit of the DMA and the Network on Chip, which eliminates or alleviates backpressure of the post-stage circuit of the DMA and the Network on Chip on the fetching operation, further eliminates or reduces latency, and improves DMA efficiency.

The preset FIFO according to the present embodiment is configured to pre-store the instructions of the channel. According to an example of the present embodiment, the preset FIFO may be a FIFO that adopts the above-described timing chip, that is, there will be one beat of latency between a read request and read data of the preset FIFO. According to another example of the present disclosure, the preset FIFO may be a memory adopting combined logic, that is, the read request and the read data of the preset FIFO occur in the same beat.

With continued reference to FIG. 11B, each preset FIFO may be configured to store instruction data of at least one channel. In one example, the DMA in FIG. 11B, for example, has a total of eight preset FIFOs; each preset FIFO is configured to store instruction data of one channel, that is, preset FIFO #1 stores instruction data of channel 1, preset FIFO #2 stores instruction data of channel 2, and so on.

In another example, the DMA in FIG. 11B, for example, has a total of four preset FIFOs; each preset FIFO is configured to store instruction data of two channels, that is, preset FIFO #1 stores instruction data of channel 1 and channel 2, preset FIFO #2 stores instruction data of channel 3 and channel 4, and so on.

Hereinafter, it is illustrated by taking that each preset FIFO stores instruction data of one channel as an example. As illustrated in FIG. 11B, the preset FIFO may transmit a signal for handshaking to the first Round Robin scheduling circuit every time writing of a piece of instruction data is completed, for example, it may transmit a CH_done signal to the first Round Robin scheduling circuit to indicate that writing of a piece of instruction data has been successfully completed on the channel corresponding to the preset FIFO. After receiving the CH_done signal transmitted by the preset FIFO, the first Round Robin scheduling circuit may switch the channel (e.g., one beat) and output channel tag CH_tag after switching the channel; and the instruction reading control circuit reads the data from the corresponding channel in the instruction virtual channel storage circuit to the corresponding preset FIFO, according to channel tag CH_tag, so as to pre-fetch instruction data of respective channels to the preset FIFO.

In one example, before pre-fetching the instruction data to the preset FIFO, the instruction reading control circuit may judge whether a storage region of a corresponding channel in the instruction virtual channel storage circuit is empty and whether a corresponding preset FIFO is full; if the storage region of the corresponding channel in the instruction virtual channel storage circuit is non-empty and the corresponding preset FIFO is non-full, the instruction data is pre-fetched to the preset FIFO. In the example, when fetching instructions from the instruction virtual channel storage circuit, the first Round Robin scheduling circuit moves instruction data on eight channels to eight preset FIFOs in a Round Robin manner, so as to complete a pre-fetching operation of instruction data on each channel.

With continued reference to FIG. 11B, the AXI interface control circuit includes the second Round Robin scheduling circuit, the second Round Robin scheduling circuit is subject to backpressure of the post-stage circuit of the DMA and the Network on Chip, that is, when pulled down, GLB_instr_ready or Ar_ready signal will back press the second Round Robin scheduling circuit. The second Round Robin scheduling circuit polls data transmission states on the eight channels, and may switch to a next channel after completing a data transmission on the current channel. The second Round Robin scheduling circuit may output channel tag CH_tag.

A multiplexer is further included between the preset FIFO and the AXI interface control circuit. In the above-described example, output terminals of the eight preset FIFOs may be coupled to an input terminal of the multiplexer, and the channel tag CH_tag output by the second Round Robin scheduling circuit may be taken as a selection terminal of the multiplexer. Exemplarily, when the channel tag output by the second Round Robin scheduling circuit is CH_1 (i.e., channel 1), the multiplexer may select preset FIFO #1 (i.e., the preset FIFO configured to pre-fetch the instruction data on channel 1), so as to read the instruction data on channel 1 into the AXI interface control circuit.

Figure 12:
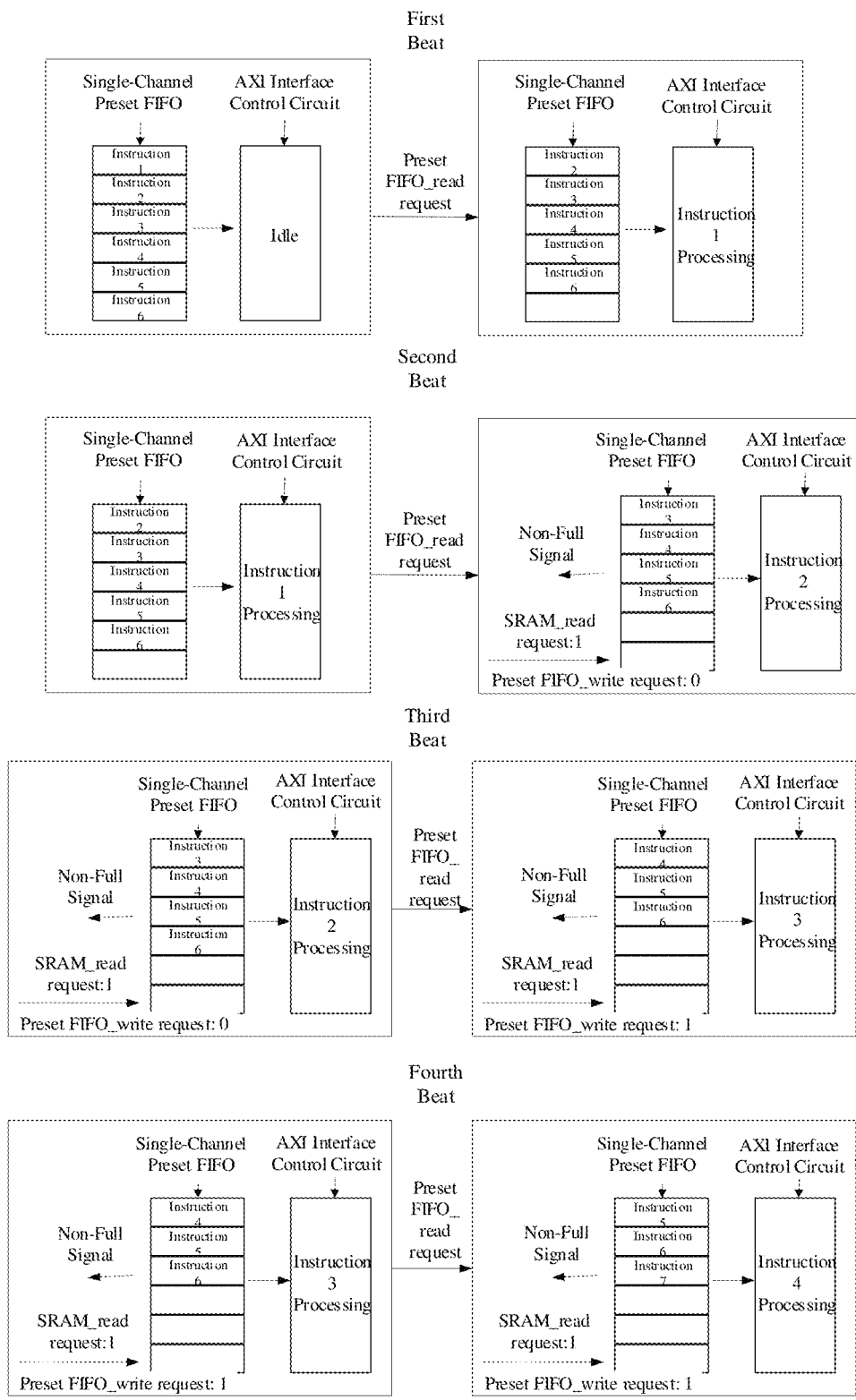
FIG. 12 illustrates an example of a DMA operation timing chart in a single-channel switching mode in FIG. 11B.

FIG. 12 illustrates an example of a DMA operation timing chart in a single-channel switching mode in FIG. 11B. As illustrated in FIG. 12, the preset FIFO has a depth of 6, and may store six instructions, namely, instruction 1, instruction 2, instruction 3, instruction 4, instruction 5, and instruction 6. The preset FIFO is configured to store instruction data on a single channel, for example, configured to store the instruction data of the DMA in FIG. 11B on channel 1. It is assumed that the post-stage circuit of the DMA and the Network on Chip in FIG. 11B are constantly in a ready state, that is, GLB_instr_ready and Ar_ready are constantly high. Meanwhile, it is assumed that a limit processing speed of the AXI interface control circuit is one piece of instruction data per beat.

At the beginning of the first beat (e.g., the rising edge of the first beat), the AXI interface control circuit is idle. The preset FIFO_read request signal is high in the first beat, and the preset FIFO may be the memory adopting combined logic as described above in the present disclosure. Because the read request and the read data of the preset FIFO occur at the same beat, instruction 1 read in the first beat according to preset FIFO_read request is read from the preset FIFO into the AXI interface control circuit, and the AXI interface control circuit processes the instruction 1 in the first beat.

In the second beat, the preset FIFO_read request signal continues to be high, and meanwhile, the AXI interface control circuit has completed processing on the instruction 1, so instruction 2 continues to be read into the AXI interface control circuit in the second beat according to preset FIFO_read request, and the AXI interface control circuit processes the instruction 2 in the second beat. Because an empty/full state of the FIFO may only be perceived in a next beat of a read or write operation, the first Round Robin scheduling circuit has not yet perceived that the preset FIFO is in a non-full state in the first beat in which the instruction 1 is read from the preset FIFO into the AXI interface control circuit, and thus SRAM_read request is low (e.g., 0). In the second beat, the first Round Robin scheduling circuit perceives that the preset FIFO is in a non-full state, and instruction data may continue to be written into the preset FIFO, so SRAM_read request is high (e.g., 1) and instruction data (e.g., instruction 7) is read from the instruction virtual channel storage circuit in a next beat. Because instruction data (e.g., instruction 7) is still not read from the instruction virtual channel storage circuit in the second beat, preset FIFO_write request is low (e.g., 0).

In the third beat, the preset FIFO_read request signal continues to be high, and meanwhile, the AXI interface control circuit has completed processing on instruction 2, so instruction 3 continues to be read into the AXI interface control circuit in the third beat according to preset FIFO_read request, and the AXI interface control circuit processes instruction 3 in the third beat. In the third beat, according to SRAM_read request of the second beat, instruction data (e.g., instruction 7) is successfully written into a write port of the preset FIFO, and at this time, preset FIFO_write request is high (e.g., 1). Because the preset FIFO is still in a non-full state in the third beat, SRAM_read request continues to be high (e.g., 1) and instruction data (e.g., instruction 8) is read out from the instruction virtual channel storage circuit in a next beat.

In the fourth beat, the preset FIFO_read request signal continues to be high, and meanwhile, the AXI interface control circuit has completed processing on instruction 3, so instruction 4 continues to be read into the AXI interface control circuit in the fourth beat according to preset FIFO_read request, and the AXI interface control circuit processes instruction 4 in the fourth beat. When AXI interface control circuit processes instruction 4, new instruction data (e.g., instruction 7) is already successfully written into the preset FIFO.

Similarly, in the fifth beat, when the AXI interface control circuit processes instruction 5, new instruction data (e.g., instruction 8) is also successfully written into the preset FIFO already, and so on, so as to implement pipeline processing on instructions by the DMA and improve DMA efficiency.

In at least some embodiments of the present disclosure, by introducing the double Round Robin scheduling mechanism to the DMA, and separating logic of instruction fetching at the instruction virtual channel storage circuit from the post-stage circuit of the DMA and the Network on Chip, instruction fetching at the instruction virtual channel storage circuit is no longer subject to backpressure of the post-stage circuit of the DMA and the Network on Chip, which, thus, not only eliminates or reduces latency caused by switching between different channels, but also eliminates or reduces latency in a single channel switching mode, thereby improving DMA efficiency.

In at least some embodiments of the present disclosure, by introducing the double Round Robin scheduling mechanism, the DMA may not only eliminate or reduce latency caused by switching between different channels, but also eliminate or reduce latency caused in the single channel switching mode. On the other hand, when the DMA in FIG. 11B writes instructions into the preset FIFO, there is a risk of reading extra one piece of instruction data. The risk of DMA in FIG. 11B reading extra instruction data will be described below in conjunction with FIG. 13A.

Figure 13A:
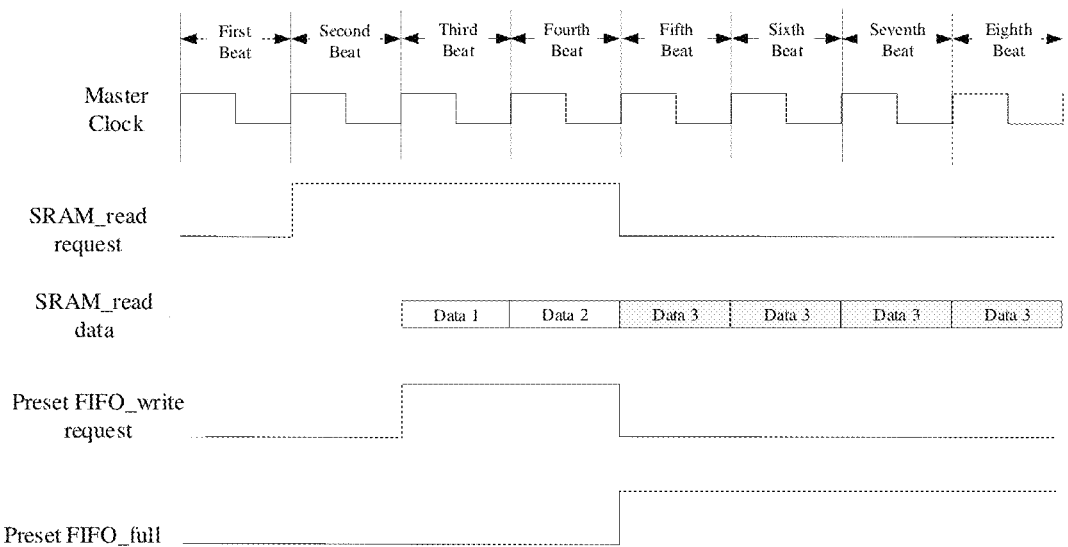
FIG. 13A illustrates a risk of DMA reading extra instruction data in FIG. 11B.

As illustrated in FIG. 13A, it is assumed that a single-channel preset FIFO according to the present disclosure has a depth of 2 (i.e., only two pieces of instruction data may be written into the preset FIFO). In the second beat and the third beat, SRAM_read request is high, the data may be respectively read from the instruction virtual channel storage circuit in the DMA in a next beat and placed at a write port of the preset FIFO, that is, data 1 and data 2 may be read out and placed at the write port of the preset FIFO respectively in the third beat and the fourth beat. In the third beat and the fourth beat, preset FIFO_write request is high, so data 1 and data 2 are written into the preset FIFO respectively in the third beat and the fourth beat.

Because the preset FIFO is full of instruction data in the fourth beat, a full signal of the preset FIFO (preset FIFO_full) is pulled up at a rising edge of the fifth beat, that is, the preset FIFO_full is high in the fifth beat. Because an empty/full state of the preset FIFO may only be perceived in a next beat of a read/write operation, the instruction reading control circuit in the DMA still does not perceive that the preset FIFO is in a full state in the fourth beat. If the instruction virtual channel storage circuit in the DMA still has instruction data in the fourth beat, SRAM_read request continues to be high. In the fifth beat, according to SRAM_read request of the previous beat, data 3 is read out from the instruction virtual channel storage circuit and placed at the write port of the preset FIFO. Because in the fifth beat, preset FIFO_full is high and back presses preset FIFO_write request, preset FIFO_write request is pulled down in the fifth beat, causing a risk that data 3 read as an extra piece is blocked at the write port of the preset FIFO and cannot be written.

Based on the above-described embodiments, at least one embodiment of the present disclosure proposes a method for controlling data writing, so as to avoid the risk that the DMA read extra instructions in FIG. 11B.

Figure 13B:
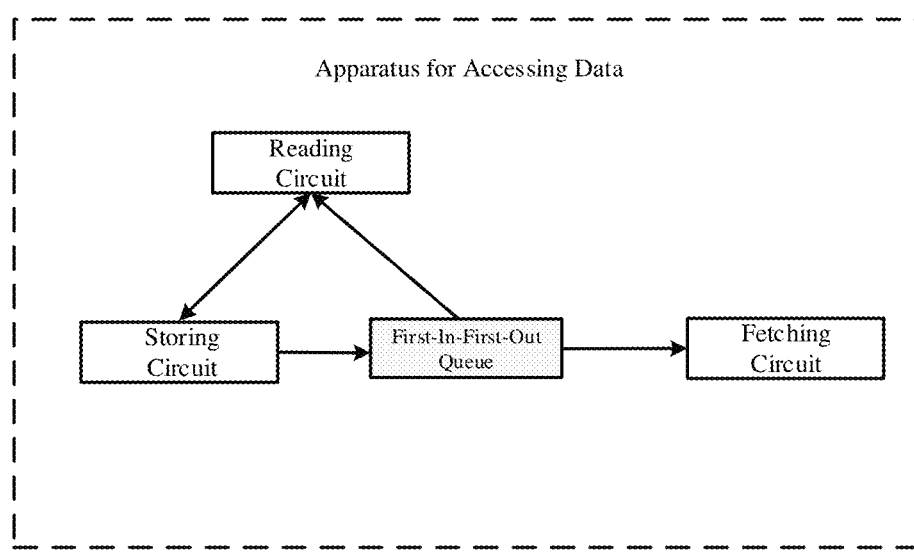
FIG. 13B illustrates a structural schematic diagram of an apparatus for accessing data according to at least one embodiment of the present disclosure.

FIG. 13B illustrates a structural schematic diagram of an apparatus for accessing data according to at least one embodiment of the present disclosure. As illustrated in FIG. 13B, the apparatus for accessing data includes a storing circuit, a reading circuit, a first-in-first-out queue, and a fetching circuit; the storing circuit is configured to store the data received by the apparatus; the reading circuit is configured to read the data out of the storing circuit according to a read request signal and write the data into the first-in-first-out queue; the first-in-first-out queue is configured to execute writing of the data according to a control signal; the fetching circuit is configured to fetch the data out of the first-in-first-out queue; the read request signal is under control of a first state signal of the first-in-first-out queue and a second state signal of the storing circuit; and the first state signal indicates a full state or a non-full state of the first-in-first-out queue, and the second state signal indicates an empty state or a non-empty state of the storing circuit. In the example, the data may be the R-type instruction as described above in the present disclosure, and the storing circuit may be the instruction virtual channel storage circuit as described in the present disclosure. It should be noted that in the example, the data may also be any other type of instruction data or any non-instruction type of data, for example, the data may be instruction data configured to execute a specific operation, or may also be various data with information as carriers. In the example, the reading circuit may acquire the first state signal from the first-in-first-out queue, and acquire the second state signal from the storing circuit. If the first-in-first-out queue is full of data (i.e., there is no address space for storing a next piece of data), the first state signal may indicate the full state of the first-in-first-out queue; otherwise, the first state signal may indicate the non-full state of the first-in-first-out queue. If the storing circuit has no data (e.g., the reading circuit has read all the data therein into the first-in-first-out queue), the second state signal may indicate the empty state of the storing circuit; otherwise, the second state signal may indicate the non-empty state of the storing circuit. As an example that the read request signal is under control of the first state signal and the second state signal, if the first state signal indicates the non-full state of the first-in-first-out queue and the second state signal indicates the non-empty state of the storing circuit, the read request signal is high (i.e., which indicates that the read request is valid), otherwise, the read request signal is low (i.e., which indicates that the read request is invalid). In one example, the control signal may be under control of the first state signal. In another example, the control signal may be under control of the read request signal and the first state signal. In yet another example, the control signal may be under control of a third state signal indicating an almost-full/non-almost-full state of the first-in-first-out queue. These specific embodiments of the control signal will be described in detail below.

According to an example of the present disclosure, data writing may be controlled according to a falling edge of a full signal of the preset FIFO. In the example, when the full signal of the preset FIFO is pulled down, the instruction data read as an extra piece is written by detecting the falling edge of the full signal.

Figure 14:
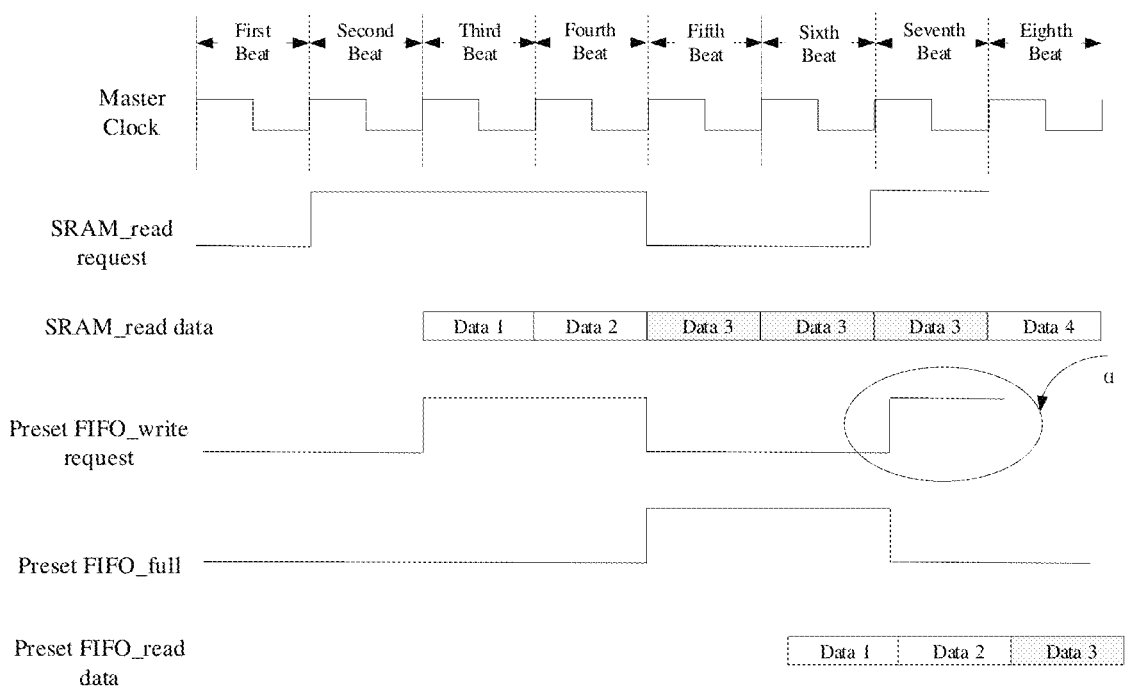
FIG. 14 illustrates an example of an operation timing chart of controlling writing of instruction data according to a falling edge of a full signal of the preset FIFO.

FIG. 14 illustrates an example of an operation timing chart of controlling writing of instruction data according to a falling edge of a full signal of the preset FIFO.

In FIG. 14, the operation timing chart from the first beat to the fifth beat is the same as that illustrated in FIG. 13A, and no details will be repeated here. As illustrated in FIG. 14, data 3 read as an extra piece in the fifth beat is blocked at the write port of the preset FIFO and cannot be written; the AXI interface control circuit of the DMA in FIG. 11B fetches data 1 out of the preset FIFO in the sixth beat, so that the preset FIFO vacates one storage address, and therefore, the preset FIFO in the sixth beat is in a non-full state and may be perceived in a next beat. In the seventh beat, the AXI interface control circuit of the DMA in FIG. 11B fetches data 2 out of the preset FIFO, so that the preset FIFO vacates another storage address, and meanwhile, preset FIFO_full is pulled down in the seventh beat, the non-full state of the preset FIFO is perceived in the seventh beat, so SRAM_read request is pulled up in the seventh beat and data 4 is fetched out of the instruction virtual channel storage circuit of the DMA in FIG. 11B in a next beat. In the example, as illustrated by an a position in FIG. 14, the falling edge of the full signal of the preset FIFO (preset FIFO_full) is being detected; if the falling edge of the full signal is detected, preset FIFO_write request is pulled up, so that data 3 read as an extra piece is written into the preset FIFO in a next beat when the preset FIFO is in the non-full state (i.e., the seventh beat in FIG. 14), thereby avoiding the risk that the instruction data read as an extra piece is blocked at the write port of the preset FIFO and cannot be written.

Although at least some embodiments of the present disclosure propose the solution for controlling data writing by detecting the falling edge of the full signal of the preset FIFO, yet in an extreme case, when the DMA in FIG. 11B pre-stores instructions in the preset FIFO, the DMA may not read extra one piece of instruction data; on this premise, controlling data writing only by detecting the falling edge of the full signal of the preset FIFO will lead to a risk of writing invalid data.

Figure 15:
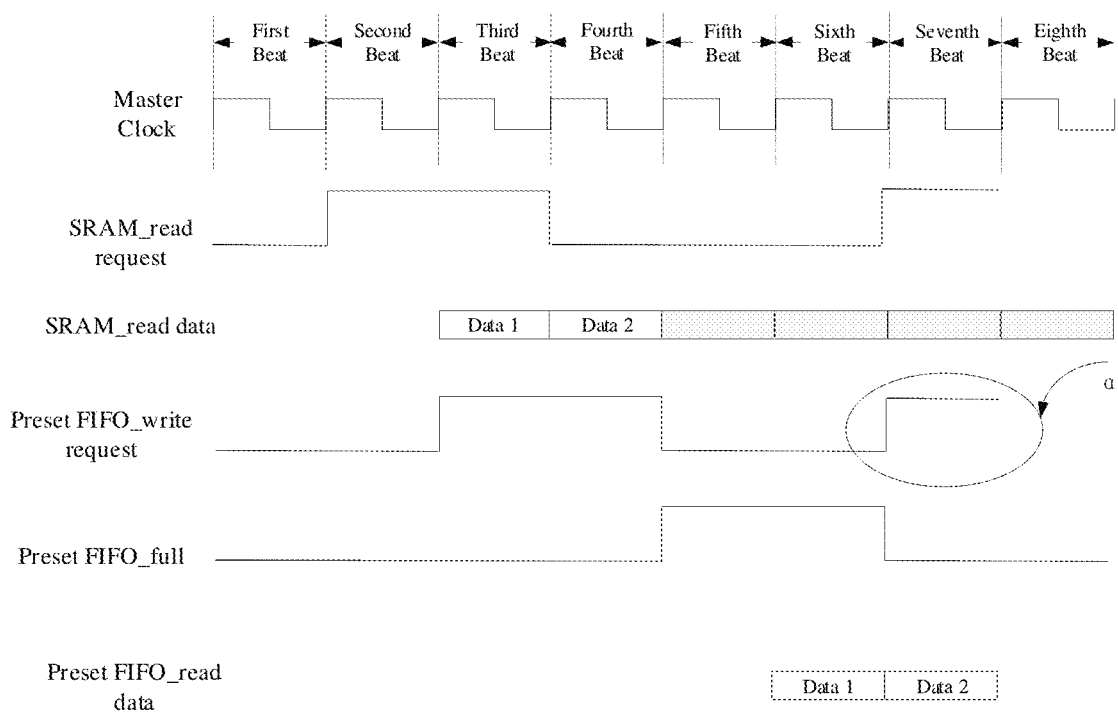
FIG. 15 illustrates a risk of writing invalid data caused by controlling data writing by detecting only the falling edge of the full signal.

FIG. 15 illustrates a risk of writing invalid data caused by controlling data writing by detecting only the falling edge of the full signal. As illustrated in FIG. 15, from the second beat to the fourth beat, states of the preset FIFO perceived by the instruction reading control circuit of the DMA in FIG. 11B are all non-full states, so from the second beat to the fourth beat, SRAM_read request will not be subject to backpressure of the preset FIFO_full signal. However, if there is no readable instruction data in the instruction virtual channel storage circuit of the DMA in FIG. 11B in the fourth beat (i.e., the storage region of the corresponding channel in the instruction virtual channel storage circuit is empty), SRAM_read request will be subject to backpressure of the empty state of the instruction virtual channel storage circuit in the fourth beat, so SRAM_read request is pulled down in the fourth beat, and at this time, the preset FIFO is just in the full state, so there is no risk of reading extra one piece of instruction data. If preset FIFO_write request is still pulled up (i.e., as illustrated by a in FIG. 15) when the falling edge of the preset FIFO full signal is detected, then invalid data will be written into the preset FIFO in the seventh beat, thereby introducing a risk.

Based on the above-described embodiments, the present disclosure provides a solution for controlling data writing through a flag signal, so as to avoid writing invalid data while avoiding a risk of reading extra one piece of instruction data.

According to an example of the present disclosure, the flag signal may be determined according to the full signal of the preset FIFO and the SRAM_read request signal. The instruction virtual channel storage circuit in the DMA in FIG. 11B shakes hands with the preset FIFO through the flag signal; when the flag signal is valid, instruction data may be written from the instruction virtual channel storage circuit into the preset FIFO; and when the flag signal is invalid, the instruction data is forbidden to be written from the instruction virtual channel storage circuit into the preset FIFO.

Figure 16:
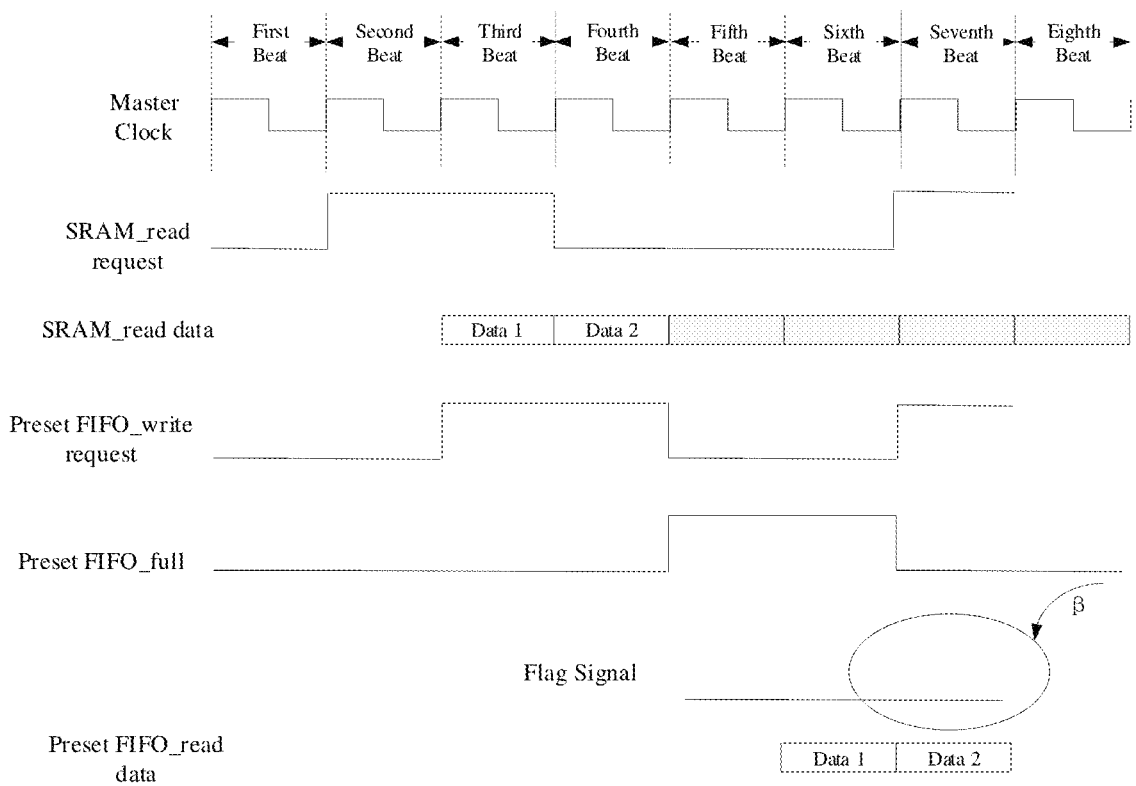
FIG. 16 illustrates an operation timing chart of controlling data writing according to an example of a flag signal according to the present disclosure.

FIG. 16 illustrates an operation timing chart of controlling data writing according to an example of a flag signal according to the present disclosure. In the example, the flag signal is obtained by performing an AND logic operation on the falling edge of the SRAM_read request signal and the full signal of the preset FIFO. As illustrated in FIG. 16, the falling edge of SRAM_read request is detected in the third beat (to be high), while the full signal of the preset FIFO at the falling edge of the third beat is low, and the two may undergo an AND operation, resulting in that the flag signal is low; when the flag signal is low, it may back press the preset FIFO_write request signal in the seventh beat, so that the data is not written into the preset FIFO in the seventh beat, thereby avoiding the risk of writing invalid data into the preset FIFO. Similarly, as illustrated in FIG. 14, if the falling edge of SRAM_read request is detected in the fourth beat (to be high), while the full signal of the preset FIFO at the falling edge of the fourth beat is high, the two may undergo an AND operation, resulting in that the flag signal is high; when the flag signal is high, it may enable the preset FIFO_write request signal in the seventh beat, so that instruction data read as an extra piece in the seventh beat may be written into the preset FIFO, thereby avoiding the risk that the instruction data read as an extra piece is blocked at the write port of the preset FIFO and cannot be written.

At least some embodiments of the present disclosure propose to control data writing through the flag signal so as to avoid the risk of reading extra instruction data; on the other hand, when the solution is applied to switching between a plurality of different channels, there may be a risk that the instruction data read as an extra piece on the current channel is written into a preset FIFO on other channel, thereby causing incorrect instruction writing.

Based on the above-described embodiment, the present disclosure proposes to control data writing by using an Almost_Full mechanism in the FIFO.

Figure 17:
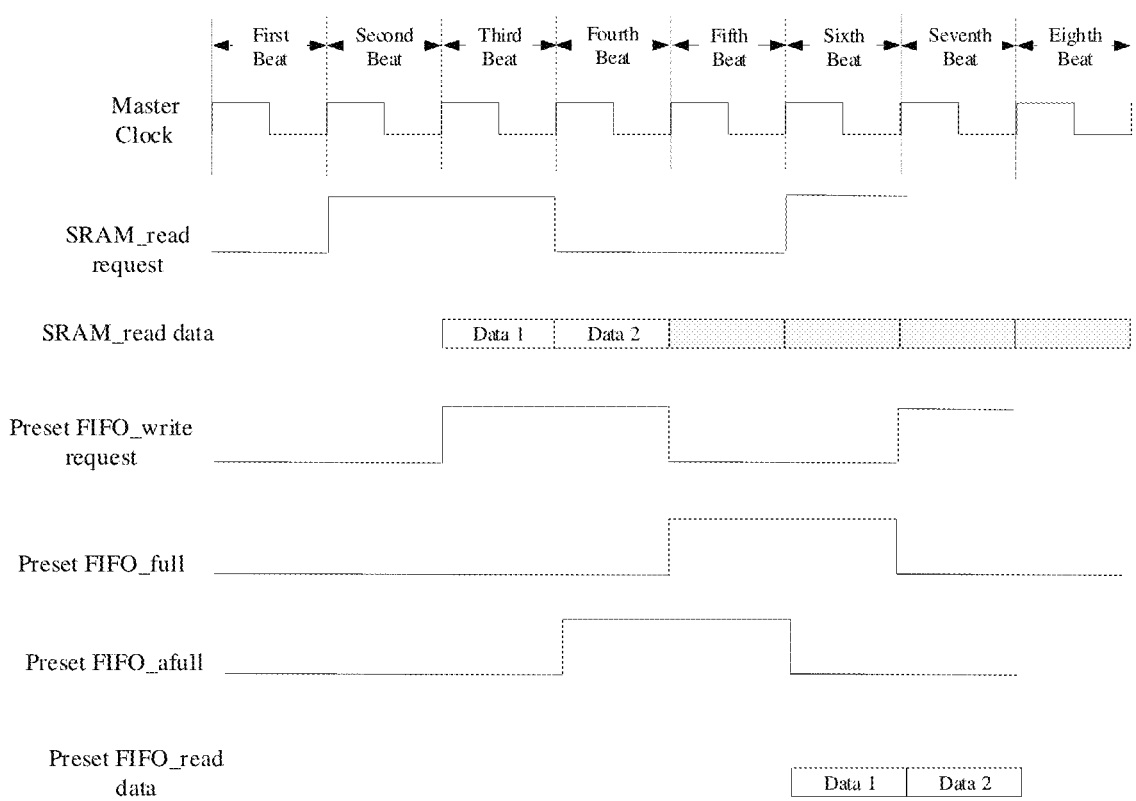
FIG. 17 illustrates an example of an operation timing chart of controlling data writing by using an Almost_Full signal (hereinafter referred to as a full signal) according to the present disclosure.

FIG. 17 illustrates an example of an operation timing chart of controlling data writing by using an Almost_Full signal (hereinafter referred to as afull signal) according to the present disclosure. As illustrated in FIG. 17, in the second beat and the third beat, SRAM_read request is high, and according to the SRAM_read request signal, the DMA in FIG. 11B writes data 1 and data 2 into the preset FIFO respectively in the third beat and fourth beat. Because the depth of the preset FIFO is 2, when a first piece of data is stored into the preset FIFO (i.e., in the third beat), the preset FIFO is in an almost-full state and pulls up the afull signal indicating the almost-full state in a next beat, so preset FIFO_afull (i.e., the afull signal of the preset FIFO) is high in the fourth beat. In the fourth beat, the preset FIFO_afull signal pulled up may back press the SRAM_read request signal, thereby avoiding the instruction reading control circuit of the DMA in FIG. 11B from continuing to read data from the instruction virtual channel storage circuit.

At least some embodiments of the present disclosure propose to control data writing by using the Almost_Full mechanism in the FIFO, so as to avoid the risk of reading extra instruction data in the single-channel switching mode and the multi-channel switching mode; on the other hand, if the depth of the preset FIFO in the DMA in FIG. 11B is 2, at least two beats of latency will be introduced. Based on this, preferably, in an example of the present disclosure, the depth of the preset FIFO is selected as 4, and in this case, the Almost_Full signal is selected to be pulled up when three pieces of data are stored therein, so as to solve the two beats of latency introduced when the preset FIFO depth is 2, implement pipeline processing of instruction data by the DMA in FIG. 11B, and improve efficiency of DMA.

The present disclosure uses specific words to describe the embodiments of the present disclosure. For example, "the first/second embodiment", "an embodiment", and/or "some embodiments" refer to a certain feature, structure, or characteristic related to at least one embodiment of the present disclosure. Therefore, it should be emphasized and noted that, "an embodiment" or "one embodiment" or "an alternative embodiment" described twice or more in different positions in this specification does not necessarily refer to the same embodiment. In addition, certain features, structures, or characteristics in one or more embodiments of the present disclosure may be appropriately combined.

In addition, those skilled in the art may understand that various aspects of the present disclosure may be illustrated and described through a number of patentable categories or situations, including any new and useful combination of processes, machines, products or substances, or any new and useful improvements to them. Accordingly, the respective aspects of the present disclosure may be completely executed by hardware, software (including firmware, resident software, microcode, etc.), or a combination of hardware and software. The above-mentioned hardware or software may all be referred to as "data block", "module", "engine", "unit", "component" or "system". Further, various aspects of the present disclosure may be represented as a computer product located in one or more computer readable media, and the product includes computer readable program codes.

Unless otherwise defined, all terms used herein (including technical and scientific terms) have the same meaning as commonly understood by those ordinarily skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present disclosure.

The above are illustrations of the present disclosure, and should not be considered as limitations thereof. Although several exemplary embodiments of the present disclosure are described, those skilled in the art will readily understand that a number of modifications can be made to the exemplary embodiments without departing from novel teaching and advantages of the present disclosure. Therefore, all these modifications are intended to be included in the scope of the present disclosure as defined in the claims. It should be understood that, the above are illustrations of the present disclosure, and should not be considered as limited to the specific embodiments disclosed, and the modifications to the disclosed embodiments and other embodiments are intended to be included in the scope of the appended claims. The present disclosure is defined by the claims and equivalents thereof.

The invention claimed is:

1. A processing apparatus for executing data processing on a plurality of pieces of channel information, comprising a channel information acquiring circuit, a storing circuit, a reading circuit, and a pre-storing circuit, wherein
the channel information acquiring circuit is configured to acquire target channel information among the plurality of pieces of channel information;

the storing circuit comprises a plurality of storage regions corresponding to the plurality of pieces of channel information, and each of the plurality of storage regions is configured to store data information for any one piece of channel information among the plurality of pieces of channel information;

the reading circuit is configured to sequentially pre-store the data information from the plurality of storage regions of the storing circuit to the pre-storing circuit;

the pre-storing circuit is configured to pre-store the data information from the plurality of storage regions of the storing circuit to wait for use in the data processing, and output pre-stored target data information corresponding to the target channel information, according to the acquired target channel information, for use in the data processing;

the processing apparatus is a direct memory access apparatus, and the data processing comprises a data moving operation;

the data moving operation comprises moving of the data information or moving of target data indicated by the data information, the target data is data required by a neural-network processor for executing a neural network operation, and the neural-network processor comprises at least one processing unit array and a plurality of global buffer clusters; and the data information indicates address information of the target data, the address information is obtained based on a mapping relationship between the target data and at least one processing unit in the processing unit array, and each of the global buffer clusters is configured to receive the moved data information or the moved target data on one piece of channel information among the plurality of pieces of channel information.

2. The processing apparatus according to claim 1, wherein the pre-storing circuit comprises:
 a plurality of storing sub-circuits, wherein each of the plurality of storing sub-circuits is configured to store the data information corresponding to any one piece of the plurality of pieces of channel information or at least one piece of selected channel information, to wait for use in the data processing; and
 a multiplexer, configured to select a storing sub-circuit corresponding to the target channel information from the plurality of storing sub-circuits, according to the target channel information, to wait for use in the data processing.

3. The processing apparatus according to claim 2, wherein the reading circuit comprises:
 a first Round Robin scheduling circuit, configured to perform Round Robin and determine one piece of channel information among the plurality of pieces of channel information to execute the pre-storing; and
 a data reading control circuit, configured to read the data information in the storage region corresponding to the one piece of the channel information into the storing sub-circuit, according to the one piece of channel information, to wait for use in the data processing.

4. The processing apparatus according to claim 3, wherein the first Round Robin scheduling circuit is further configured to,
 in response to completion of a pre-storing operation on a current channel information and the data information in the storing circuit being non-empty, execute a next time of Round Robin to determine a next piece of channel information to execute the pre-storing operation.

5. The processing apparatus according to claim 3, wherein the channel information acquiring circuit comprises:
 a second Round Robin scheduling circuit, configured to perform Round Robin and determine the target channel information among the plurality of pieces of channel information to execute the data processing.

6. The processing apparatus according to claim 5, wherein the second Round Robin scheduling circuit is further configured to,
 in response to completion of the data processing on a current channel information, execute a next time of Round Robin to determine a next piece of channel information to execute the data processing.

7. The processing apparatus according to claim 2, wherein the storing sub-circuit comprises a first-in-first-out queue based on combined logic, and
 the first-in-first-out queue is configured to enable a request signal for the first-in-first-out queue and data information associated with the request signal to occur in a same clock cycle.

8. The processing apparatus according to claim 1, further comprising:
 an interface control circuit, configured to acquire the target data information from the pre-storing circuit, generate a data moving request according to the target data information, and execute the data moving operation according to the data moving request.

9. A computer system, comprising:
 the processing apparatus according to claim 1; and
 a neural-network processor, wherein the neural-network processor is electrically coupled to the processing apparatus, and the neural-network processor comprises at least one processing unit array and a plurality of global buffer clusters; and
 the data information indicates address information of target data, the address information is obtained based on a mapping relationship between the target data and at least one processing unit in the processing unit array, and each of the global buffer clusters is configured to receive the moved data information or the moved target data indicated by the data information on one piece of channel information among the plurality of pieces of channel information.

10. The computer system according to claim 9, further comprising:
 an interface decoder, configured to receive an initial instruction and decode the initial instruction to obtain the data information, and supply the data information decoded to the processing apparatus.

11. The computer system according to claim 10, further comprising:
 an auxiliary processor, configured to supply the initial instruction to the interface decoder.

12. The computer system according to claim 11, wherein the auxiliary processor is coupled to the interface decoder through a second data transmission protocol,
 the neural-network processor is coupled to the processing apparatus through a first data transmission protocol, and
 the first data transmission protocol is different from the second data transmission protocol.

13. A scheduling method for executing data processing on a plurality of pieces of channel information, comprising:
 pre-storing data information for any one piece of channel information among the plurality of pieces of channel information from a plurality of storage regions corresponding to the plurality of piece of channel information, to wait for use in the data processing;

acquiring target channel information among the plurality of pieces of channel information; and outputting target data information pre-stored corresponding to the target channel information, according to the target channel information acquired, to wait for use in the data processing, wherein the scheduling method is used in a direct memory access apparatus, and the data processing comprises a data moving operation, wherein the data moving operation comprises moving of the data information or moving of target data indicated by the data information, the target data is data required by a neural-network processor for executing a neural network operation, and the neural-network processor comprises at least one processing unit array and a plurality of global buffer clusters, and wherein the data information indicates address information of the target data, the address information is obtained based on a mapping relationship between the target data and at least one processing unit in the processing unit array, and each of the global buffer clusters is configured to receive the moved data information or the moved target data on one piece of channel information among the plurality of pieces of channel information.

14. The scheduling method according to claim 13, wherein pre-storing data information for any one piece of channel information among the plurality of pieces of channel information from the plurality of storage regions corresponding to the plurality of piece of channel information, to wait for use in the data processing, comprises:

performing Round Robin and determining one piece of channel information among the plurality of pieces of channel information to execute the pre-storing; and reading data information in a storage region corresponding to the one piece of the channel information into a storing sub-circuit, according to the one piece of channel information, to wait for use in the data processing.

15. The scheduling method according to claim 13, wherein acquiring the target channel information among the plurality of pieces of channel information comprises:

performing Round Robin and determining the target channel information among the plurality of pieces of channel information to execute the data processing; and outputting the target data information pre-stored corresponding to the target channel information, according to the target channel information acquired, to wait for use in the data processing, comprises:

selecting a storing sub-circuit corresponding to the target channel information, according to the target channel information, to wait for use in the data processing.

16. The scheduling method according to claim 14, wherein performing Round Robin and determining one piece of channel information among the plurality of pieces of channel information to execute the pre-storing comprises:

executing a next time of Round Robin to determine a next piece of channel information to execute a pre-storing operation, in response to completion of the pre-storage operation on a current channel information and data information in a storing circuit being non-empty.

* * * * *